United States Patent [19]
Heo

[11] Patent Number: 6,167,192
[45] Date of Patent: Dec. 26, 2000

[54] DVD DISC, DEVICE AND METHOD FOR REPRODUCING THE SAME

[75] Inventor: Jae-Hoon Heo, Suwon, Rep. of Korea

[73] Assignee: Samsung Electronics Co., Ltd., Suwon, Rep. of Korea

[21] Appl. No.: 08/917,785

[22] Filed: Aug. 27, 1997

[30] Foreign Application Priority Data

Mar. 31, 1997 [KR] Rep. of Korea ............. 97-11679

[51] Int. Cl.[7] .................................................. H04N 5/928
[52] U.S. Cl. ..................... 386/124; 386/105; 386/106
[58] Field of Search .................................. 386/124, 125, 386/96, 104, 105, 106, 95, 99, 40, 39, 46, 1, 109, 111, 112; 360/32; H04N 5/928

[56] References Cited

U.S. PATENT DOCUMENTS

| | | | |
|---|---|---|---|
| 4,777,537 | 10/1988 | Ueno et al. | 386/96 |
| 5,442,454 | 8/1995 | Aoki et al. | 386/96 |
| 5,617,407 | 4/1997 | Bareis | 369/275.3 |
| 5,703,997 | 12/1997 | Kitamura et al. | 286/97 |

*Primary Examiner*—Robert Chevalier
*Attorney, Agent, or Firm*—Staas & Halsey LLP

[57] ABSTRACT

A disc for recording audio data of multi-channels while being reciprocally used with a device for reproducing a DVD-video disc. The device for reproducing a DVD audio disc includes a video attribute of a video title set including an extended audio data mode; a sub-picture attribute thereof including the extended audio data mode; video/sub-picture packs including an extended audio stream, the extended audio stream being having an extended audio stream header and frames, the extended audio stream header having a usage area for storing an audio coding mode, sampling frequency, quantization bit number, and usage data of extended audio data, and the usage area of the extended audio data indicating bit extension, bandwidth extension, and channel extension of the extended audio data, whereby the video/sub-picture packs are made as an audio pack for selectively recording the extended audio data when recording and the audio data can be reproduced by combining reproducing data of a basic audio pack with the extended audio pack when reproducing the data from the disc.

24 Claims, 26 Drawing Sheets

FIG. 3

Left box:
- VIDEO TITLE SET INFORMATION (VTSI)
- VIDEO OBJECT SET FOR VIDEO TITLE SET MENU (VTSM_VOBS)
- VIDEO OBJECT SET FOR VIDEO TITLE SET TITLE (VTSTT_VOBS)
- BACKUP OF VIDEO TITLE SET INFORMATION (VTSI_BUP)

Right box (expansion of VTSI):
- VIDEO TITLE SET INFORMATION MANAGEMENT TABLE (VTSI_MAT)
- VIDEO TITLE SET PART_OF_TITLE SEARCH POINTER TABLE (VTS_PTT_SRPT)
- VIDEO TITLE SET PROGRAM CHAIN INFORMATION TABLE (VTS_PGCIT)
- VIDEO TITLE SET MENU PGCI UNIT TABLE (VTSM_PGCI_UT)
- VIDEO TITLE SET TIME MAP TABLE (VTS_TMAPT)
- VIDEO TITLE SET MENU CELL ADDRESS TABLE (VTS_C_ADT)
- VIDEO TITLE SET MENU VIDEO OBJECT UNIT ADDRESS MAP (VTS_VOBU_ADMAP)
- VIDEO TITLE SET CELL ADDRESS TABLE (VTS_C_ADT)
- VIDEO TITLE SET VIDEO OBJECT UNIT ADDRESS MAP (VTS_VOBU_ADMAP)

VTSI_MAT

| RBP | | CONTENTS | NUMBER OF BYTES |
|---|---|---|---|
| 0 TO 11 | VTS_ID | VTS IDENTIFIER | 12BYTES |
| 12 TO 15 | VTS_EA | END ADDRESS OF VTS | 4BYTES |
| 16 TO 27 | RESERVED | RESERVED | 12BYTES |
| 28 TO 31 | VTSI_EA | END ADDRESS OF VTSI | 4BYTES |
| 32 TO 33 | VERN | VERSION NUMBER OF DVD VIDEO SPECIFICATION | 2BYTES |
| 34 TO 37 | VTS_CAT | VTS CATEGORY | 90BYTES |
| 38 TO 127 | RESERVED | RESERVED | 4BYTES |
| 128 TO 131 | VTSI_MAT_EA | END ADDRESS OF VTSI_MAT | 60BYTES |
| 132 TO 191 | RESERVED | RESERVED | 4BYTES |
| 192 TO 195 | VTSM_VOBS_SA | START ADDRESS OF VTSM_VOBS | 4BYTES |
| 196 TO 199 | VTSTT_VOBS_SA | START ADDRESS OF VTSTT_VOBS | 4BYTES |
| 200 TO 203 | VTS_PTT_SRPT_SA | START ADDRESS OF VTS_PTT_SRPT | 4BYTES |
| 204 TO 207 | VTS_PGCIT_SA | START ADDRESS OF VTS_PGCIT | 4BYTES |
| 208 TO 211 | VTSM_PGCI_UT_SA | START ADDRESS OF VTSM_PGCI_UT | 4BYTES |
| 212 TO 215 | VTS_TMAPT_SA | START ADDRESS OF VTS_TMAPT | 4BYTES |
| 216 TO 219 | VTSM_C_ADT_SA | START ADDRESS OF VTSM_C_ADT | 4BYTES |
| 220 TO 223 | VTSM_VOBU_ADMAP_SA | START ADDRESS OF VTSTT_VOBU_ADMAP | 4BYTES |
| 224 TO 227 | VTS_C_ADT_SA | START ADDRESS OF VTS_C_ADT | 4BYTES |
| 228 TO 231 | VTS_VOBU_ADMAP_SA | START ADDRESS OF VTS_VOBU_ADMAP | 4BYTES |
| 232 TO 255 | RESERVED | RESERVED | 24BYTES |
| 256 TO 257 | VTSM_V_ATR | VIDEO ATTRIBUTE OF VTSM | 2BYTES |
| 258 TO 259 | VTSM_AST_Ns | NUMBER OF AUDIO STREAMS OF VTSM | 2BYTES |
| 260 TO 267 | VTSM_AST_ATR | AUDIO STREAM ATTRIBUTE OF VTSM | 8BYTES |
| 268 TO 323 | RESERVED | RESERVED | 56BYTES |
| 324 TO 339 | RESERVED | RESERVED | 16BYTES |
| 340 TO 341 | VTSM_SPST_Ns | NUMBER OF SUB-PICTURE STREAMS OF VTSM | 2BYTES |
| 342 TO 347 | VTSM_SPST_ATR | SUB-PICTURE STREAMS ATTRIBUTE TABLE OF VTSM | 6BYTES |
| 348 TO 511 | RESERVED | RESERVED | 164BYTES |
| 512 TO 513 | VTS_V_ATR | VIDEO ATTRIBUTE OF VTS | 2BYTES |
| 514 TO 515 | VTS_AST_Ns | NUMBER OF AUDIO STREAMS OF VTS | 2BYTES |
| 516 TO 579 | VTS_AST_ATR | AUDIO STREAM ATTRIBUTE TABLE OF VTS | 64BYTES |
| 580 TO 595 | RESERVED | RESERVED | 16BYTES |
| 596 TO 597 | VTS_SPST_Ns | NUMBER OF SUB-PICTURE STREAMS OF VTS | 2BYTES |
| 598 TO 789 | VTS_SPST_ATRT | SUB-PICTURE STREAMS ATTRIBUTE TABLE OF VTS | 192BYTES |
| 790 TO 791 | RESERVED | RESERVED | 2BYTES |
| 792 TO 983 | VTS_MU_AST_ATRT | MULTICHANNEL AUDIO STREAMS ATTRIBUTE TABLE OF VTS | 192BYTES |
| 984 TO 1023 | RESERVED | RESERVED | 40BYTES |
| 1024 TO 2047 | RESERVED | RESERVED | 1024BYTES |

FIG. 4

VTS_AST_ATR

| b63 | b62 | b61 | b60 | b59 | b58 | b57 | b56 |
|---|---|---|---|---|---|---|---|
| AUDIO CODING MODE | | | MUTICHANNEL EXTENSION | AUDIO TYPE | | AUDIO APPLICATION MODE | |

| b55 | b54 | b53 | b52 | b51 | b50 | b49 | b48 |
|---|---|---|---|---|---|---|---|
| QUANTIZATION/DRC | | FS | | RESERVED | NUMBER OF AUDIO CHANNELS | | |

| b47 | b46 | b45 | b44 | b43 | b42 | b41 | b40 |
|---|---|---|---|---|---|---|---|
| SPECIFIC CODE (UPPER BITS) | | | | | | | |

| b39 | b38 | b37 | b36 | b35 | b34 | b33 | b32 |
|---|---|---|---|---|---|---|---|
| SPECIFIC CODE (LOWER BITS) | | | | | | | |

| b31 | b30 | b29 | b28 | b27 | b26 | b25 | b24 |
|---|---|---|---|---|---|---|---|
| RESERVED (FOR SPECIFIC CODE) | | | | | | | |

| b23 | b22 | b21 | b20 | b19 | b18 | b17 | b16 |
|---|---|---|---|---|---|---|---|
| SPECIFIC CODE EXTENSION | | | | | | | |

| b15 | b14 | b13 | b12 | b11 | b10 | b9 | b8 |
|---|---|---|---|---|---|---|---|
| RESERVED | | | | | | | |

| b7 | b6 | b5 | b4 | b3 | b2 | b1 | b0 |
|---|---|---|---|---|---|---|---|
| APPLICATION INFORMATION | | | | | | | |

FIG. 5

VTS_V_ATR

| b15 | b14 | b13 | b12 | b11 | b10 | b9 | b8 |
|---|---|---|---|---|---|---|---|
| VIDEO COMPRESSION MODE | | TV SYSTEM | | ASPECT RATIO | | DISPLAY MODE | |

| b7 | b6 | b5 | b4 | b3 | b2 | b1 | b0 |
|---|---|---|---|---|---|---|---|
| LINE21_ SWITCH_1 | LINE21_ SWITCH_2 | SOURCE PICTURE RESOLUTION | | | SOURCE PICTURE LETTERBOXED | RESERVED | FILM CAMERA MODE |

FIG. 6A

VTS_SPST_ATR

| b47 | b46 | b45 | b44 | b43 | b42 | b41 | b40 |
|---|---|---|---|---|---|---|---|
| SUB-PICTURE CODING MODE | | | RESERVED | | | SUB-PICTURE TYPE | |

| b39 | b38 | b37 | b36 | b35 | b34 | b33 | b32 |
|---|---|---|---|---|---|---|---|
| RESERVED | | | | | | | |

| b31 | b30 | b29 | b28 | b27 | b26 | b25 | b24 |
|---|---|---|---|---|---|---|---|
| SPECIFIC CODE (UPPER BITS) | | | | | | | |

| b23 | b22 | b21 | b20 | b19 | b18 | b17 | b16 |
|---|---|---|---|---|---|---|---|
| SPECIFIC CODE (LOWER BITS) | | | | | | | |

| b15 | b14 | b13 | b12 | b11 | b10 | b9 | b8 |
|---|---|---|---|---|---|---|---|
| RESERVED (FOR SPECIFIC CODE) | | | | | | | |

| b7 | b6 | b5 | b4 | b3 | b2 | b1 | b0 |
|---|---|---|---|---|---|---|---|
| SPECIFIC CODE EXTENSION | | | | | | | |

FIG. 6B

DVD DISC, DEVICE AND METHOD FOR REPRODUCING THE SAME

BACKGROUND OF THE INVENTION

1. Field of the Invention

The present invention relates to a DVD disc, a device and a method for reproducing the same and more particularly, to an audio private DVD disc, a device and a method for reproducing the same.

2. Description of the Related Art

A digital versatile disc (hereinafter, referred to as DVD)-video disc is divided into a video data area, a sub-picture data area, a navigation data area, and an audio data area, and the whole capacity thereof is 4.7/8.5 Gbyte and the transmission speed is 10.08 Mbps. DVD specification allows a maximum 9 Mbps for a video stream, a maximum of 6 Mbps for an audio stream and a maximum of 6 Mbps for a sub-picture stream. However, the sum of all these streams should not exceed 10.08 Mbps, the maximum transmission speed of the entire DVD system. The data compressed with an MPEG-1/MPEG-2 video system is stored at the video area of the DVD-video disc and at maximum, eight audio data streams are stored in the audio data area thereof using linear PCM (pulse code modulation), AC-3, MPEG-2, DTS, and SDDS systems. A device for reproducing the DVD-video disc decodes the video data recorded on the DVD-video disc, restores the decoded data as the moving picture, converts the restored moving picture into analog screen information, and outputs the converted information. Also, the aforesaid device decodes the audio data and converts the decoded audio data into an analog audio signal, thereby outputting the converted signal.

The audio data recorded at the DVD-video disc as described above can provide the best sound quality in case of using the linear PCM system. However, in case of using the linear PCM system, two channels can be serviced in the audio data which is quantized at the sampling frequency of 96 KHz by 24 bits, eight channels can be serviced in the audio data which is quantized at the sampling frequency of 48 KHz by 16 bits, and channels or sampling frequencies exceeding the number of the above channels and the sampling frequencies can not be used. That is, since the DVD-video disc and the device for reproducing the same should process the video data at the maximum of 9 Mbps and the audio data at the maximum of 6 Mbps at the same time, there is a problem in that it is difficult to provide a high sound quality with multi-channels.

Coping with the foregoing problems, there have been suggested methods for improving the audio quality by using a system which is not used in the DVD-video disc. However, the methods cannot be reciprocally used with the DVD-video disc, so that the information efficiency may be lowered, thereby having a difficulty in providing the audio data of the multi-channels.

SUMMARY OF THE INVENTION

An object of the present invention is to provide a disc for recording audio data of multi-channels which may be used reciprocally in a device for reproducing data from a DVD-video disc.

Another object of the present invention is to provide a DVD-audio disc which extends and stores the audio data at an area where non-audio data is normally stored, such as in a video area and a sub-picture area in the DVD video disc.

Still another object of the present invention is to provide a device for reproducing audio data in the DVD audio disc included with an audio data area, a video data area, a sub-picture area, other data areas, the areas other than the audio data area storing extended audio data.

Yet another object of the present invention is to provide a method for reproducing audio data in the DVD-audio disc included with an audio data area, a video area, a sub-picture area, and other data areas for storing extended audio data.

In order to accomplish the objects of the present invention, there is provided a DVD audio disc, including a DVD video area including a video management information area and a plurality of video title set areas; the video title set area including areas for storing video title set information, a video object set menu, and a plurality of video object set titles; the video title set information area including the video title set information management table; the video title set information management table area including a video title set video attribute having a video compression mode area for indicating an MPEG video compression mode and an extended audio data mode, a video title set sub-picture attribute having a sub-picture coding mode area for indicating a sub-picture mode and the extended audio data mode, and a video title set audio attribute including an audio coding mode area; video object sets of the video title set title including a plurality of video packs, sub-picture packs and audio packs, the packs having a plurality of frames in which a header and real data are recorded; the video stream and sub-picture stream including an extended audio header having a channel number, a sampling frequency, and a plurality of the channel headers corresponding to the channel number; the channel headers including an area for storing the channel number of the corresponding channel, a coding mode of the extended audio data, usage of the extended audio data, a quantization bit number of the extended audio data, and a sampling frequency of the extended audio data; and the usage area of the extended audio data indicative of corresponding extension usage such as bit extension, bandwidth extension, and channel extension, whereby the video stream and the sub-picture stream of the DVD area can be reproduced.

Further, the present invention is provided with a device for reproducing a DVD audio disc, comprising a basic audio decoder; an extended audio decoder; and an extender, whereby the basic audio decoder reproduces data of an audio pack, the extended audio decoder reproduces the extended audio data and the extender combines the extended audio data with basic audio data, thereby performing bit extension, bandwidth extension, and channel extension of the audio data and outputs the combined audio data.

Furthermore, the present invention provides a method for reproducing data from a DVD audio disc, including the steps of analyzing video and sub-picture attributes of the video title set to be reproduced; enabling a basic audio decoder and an extended audio decoder in an extended audio mode; checking usage of the extended audio data included in channel headers of the corresponding video title set; and combining the extended audio data decoded at the extended audio decoder, at the basic audio decoder to be output.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein:

FIG. 3 shows the structure of VTSI in FIG. 2;

FIG. 4 shows the structure of VTS_MAT in FIG. 3;

FIG. 5 shows the structure of VTS_AST_ATR in FIG. 4 according to the embodiment of the present invention;

FIG. 6A shows the structure of VTS_V_ATR according to the embodiment of the present invention;

FIG. 6B shows the structure of VTS_SPST_ATR according to the embodiment of the present invention;

FIGS. 10A to 10C show examples of the structure of the physical data of the extended audio stream, wherein FIG. 10A is a diagram illustrating the format that the extended audio stream is recorded at the video area and the sub-picture area, FIG. 10B is a diagram illustrating the format that the extended audio stream is recorded at the video area, and FIG. 10C is a diagram illustrating the format that the extended audio stream is recorded at the sub-picture area, according to the embodiment of the present invention;

FIGS. 13A and 13B show the reproducing examples of the case that the effect channel is recorded at the extended area, wherein FIG. 13A is the process of separating an original basic signal by using the basic channel and the extended channel, and FIG. 13B is the process of intactly reproducing the basic channel and the extended channel, according to the embodiment of the present invention;

DETAILED DESCRIPTION OF THE PREFERRED EMBODIMENT(S)

A disc according to an embodiment of the present invention records basic audio data in the audio data area of a DVD-video title set, and extended audio data capable of embodying the high sound quality is recorded in the video data area, the sub-picture area, and other private stream areas.

Figure 1:
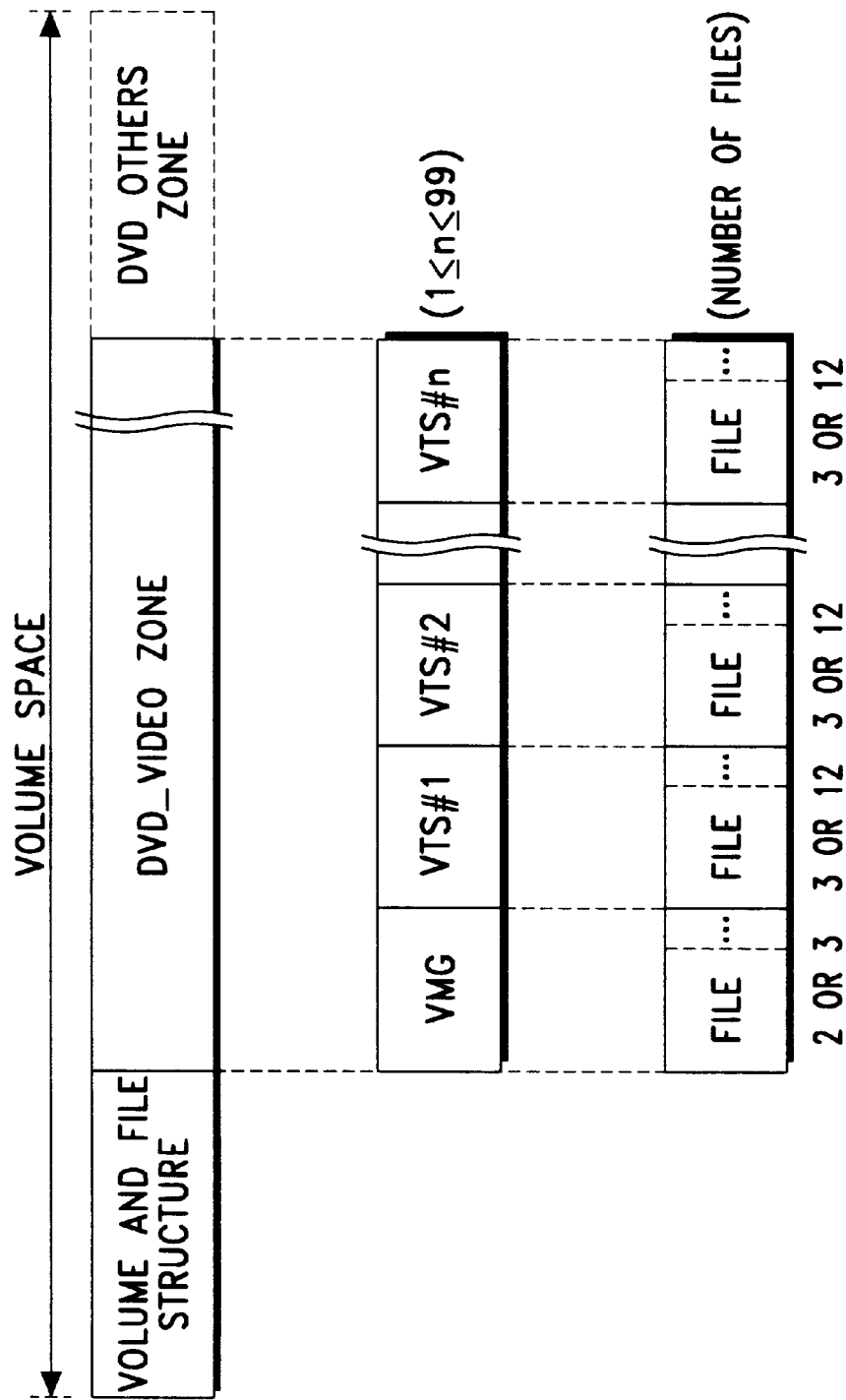
FIG. 1 shows the volume structure of a DVD disc according to an embodiment of the present invention.

Logic data structure of the DVD-video disc includes the structure of volume space, the structure of a video manager (hereinafter, referred to as VMG), the structure of a video title set (hereinafter, referred to as VTS), and the structure of video object set (hereinafter, referred to as VOBS). FIG. 1 shows the volume structure of the DVD video disc according to the embodiment of the present invention.

With reference to FIG. 1, the volume space of the DVD video disc further comprises a volume and file structure, a single DVD-video zone and DVD-others zone. One VMG and VTSs existing at a range from at least 1 to a maximum of 99 can be assigned to the DVD-video zone where the data structure of the DVD-video is assigned. The VMG is arranged at the front of the DVD-video zone and has two or three files. Also, each of the VTSs includes files numbering in a range from at least 3 to a maximum of 12.

Figure 2:
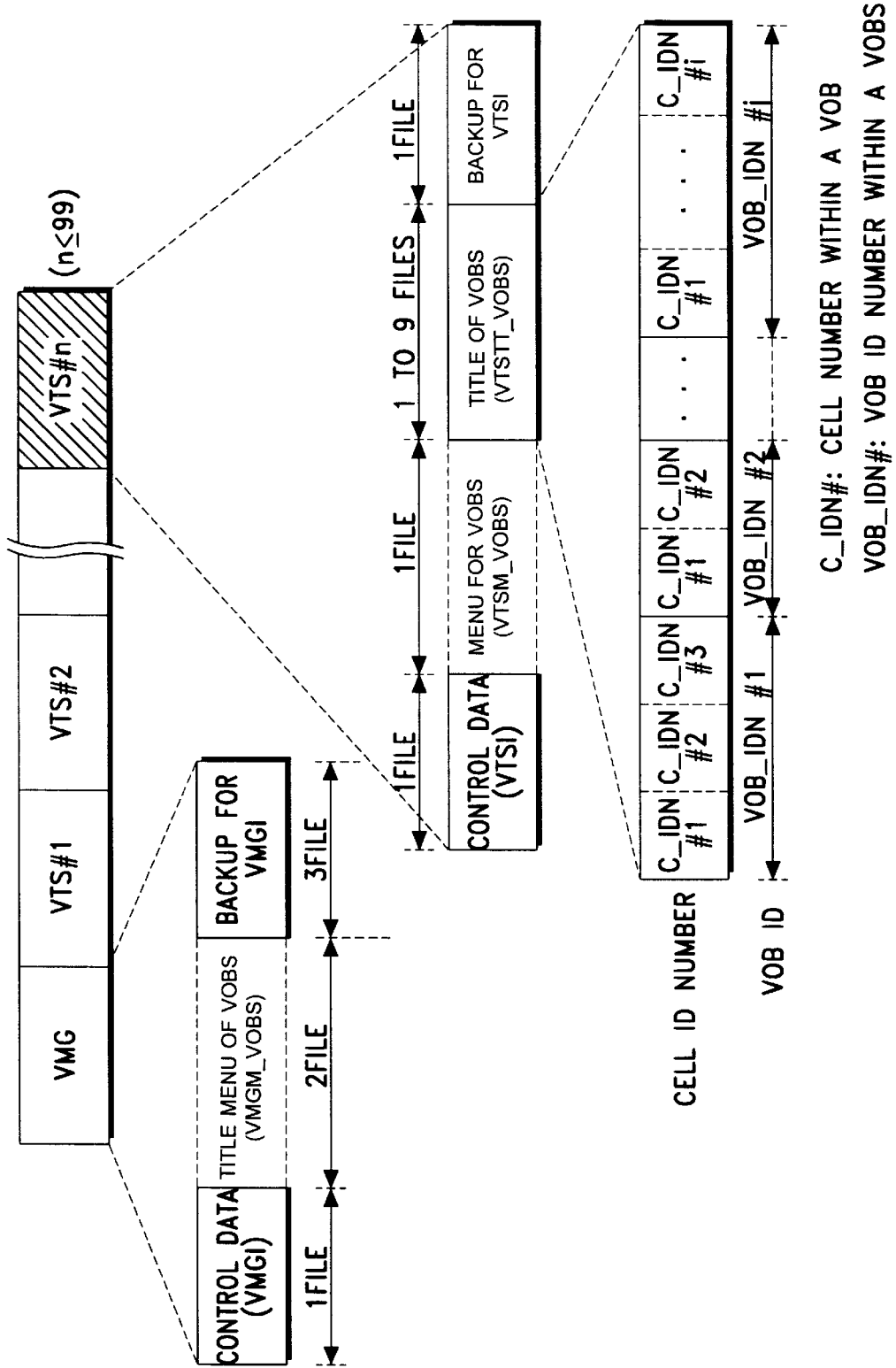
FIG. 2 shows the structures of VMG and VTS in FIG. 1.

FIG. 2 shows the structures of the VMG and VTS in FIG. 1, where all of VOBs (video objects) are recorded at contiguous blocks. The VOB is comprised of data such as the video data, the sub-picture data, and the audio data.

Referring to FIG. 2, the VMG has a video manager information (hereinafter, referred to as VMGI) file as the control data, a menu file of VOBs (VMGM_VOBS), and a VMGI backup file. In addition, each of the n VTSs is constructed with video title set information (VTSI) as the control data, a menu of the VOBs (VTSM_VOBS), a title of the VOBs (VTSTT_VOBS), and backup files of the VTSI. Further, the VTSTT_VOBS includes a plurality of C_IDNs. Herein, C_IDN# indicates the cell ID number within the VOB and VOB_IDN# indicates the VOB ID number within the VOBs.

FIG. 3 shows the structure of the VTSI in FIG. 2, where the VTSI is positioned at the front of each VTS. As shown in FIG. 3, the VTSI has information of one or more than one video titles and a video title set menu VTSM. The VTSI includes the management information of each title. Here, the title management information has the information of seeking the PTT(Part_of_Title), the VTSM information, and the information for reproducing the VOBs, and the information for attributes of VOBs.

As illustrated in FIG. 3, the video title set information VTSI includes a video title set information management table (VTSI_MAT), a video title set part_of_title search pointer table (VTS_PTT_SRPT), a video title set program chain information table (VTS_PGCIT), a video title set menu PGCI unit table (VTSM_GCI_UT), a video title set time map table (VTS_TMAPT), a video title set menu cell address table (VTSM_C_ADT), a video title set menu video object unit address map (VTSM_VOBU_ADAMP), a video title set cell address table (VTS_C_ADT), and a video title set video object unit address map (VTS_VOBU_ADMAP).

FIG. 4 shows the structure of VTSI_MAT of the DVD-video in FIG. 3, wherein the VTSI_MAT is indicative of each item of information of the VTSI and the start address of the attribute of the VOBS within the VTS.

With respect to FIG. 4, the audio stream attribute table of the VTS (VTS_AST_ATRT) of RBP 516 to 579 in the VTSI_MAT having the same structure as that of FIG. 4, stores VTS_AST_ATR #0–#7 RBPs of the eight audio streams, each of the VTS_AST_ATRs having 8 bytes as shown in FIG. 5, and the respective field's values become the internal information of the audio stream of the VTSM_VOBS.

When observing the structure of the VTS_AST_ATR with reference to FIG. 5, the information of the audio coding mode recorded firstly in b63-b61 is given as in the following table 1.

TABLE 1

| b63-b61 | Audio Coding Mode |
|---|---|
| 000b | Dolby AC-3 |
| 010b | MPEG-1 or MPEG-2 where no extension bit stream exists |
| 011b | MPEG-1 where extension bit stream exists |
| 100b | Linear PCM Audio |
| 110b | DTS (option) |
| 111b | SDDS (option) |
| others | Reserved |

The multichannel extension of b60 is an area which stores information indicative of whether the multichannel extension is executed or not. If 0b is recorded, this means that the multichannel extension is not selected. However, if 1b is recorded, this means that the multichannel extension is performed according to the information of VTS_MU_AST_ATRT recorded on RBP 792-983 of the VTSI_MAT as depicted in FIG. 6B.

The audio type of b59-b58 is shown as in the following table 2.

TABLE 2

| b59-b58 | Audio Type |
|---|---|
| 00b | Not Specified |
| 01b | Language Included |
| others | Reserved |

The audio application mode of b57-56 is shown as in the following table 3.

TABLE 3

| b57-b56 | Audio Application Mode |
|---|---|
| 00b | Not Specified |
| 01b | Karaoke Mode |
| 10b | Surround Mode |
| 11b | Reserved |

In b55-b54, quantization/DRC information is stored as follows. If the audio coding mode is "000b", 11b is recorded. If the audio coding mode is 010b or 011b, the quantization information is defined as follows.

00b: the dynamic range control data is not present in the MPEG audio stream.
01b: the dynamic range control data is present in the MPEG audio stream.
10b: reserved
11b: reserved If the audio coding mode is 100b, the quantization information is stored as shown in the following table 4.

TABLE 4

| b55-b54 | Quantization DRC |
|---|---|
| 00b | 16bits |
| 01b | 20bits |
| 10b | 24bits |
| 11b | Reserved | b53-b52, indicative of sampling frequency fs in FIG. 1, is shown as in the following table 5.

TABLE 5

| b53-b52 | fs |
|---|---|
| 00b | 48KHz |
| 01b | 96KHz |
| 10b | Reserved |
| 11b | Reserved | b50-b48 indicative of the number of audio channels in FIG. 1 is shown as in the following table 6.

TABLE 6

| b50-b48 | Number of Audio Channels |
|---|---|
| 000b | 1ch (mono) |
| 001b | 2ch (stereo) |
| 010b | 3ch (multichannel) |
| 011b | 4ch (multichannel) |
| 100b | 5ch (multichannel) |
| 101b | 6ch (multichannel) |
| 110b | 7ch (multichannel) |
| 111b | 8ch (multichannel) |
| others | Reserved |

Further, VTS_MU_ATRT (multichannel audio stream attribute table of VTS) of RBP 792-983 in the VTSI_MAT as shown in FIG. 4 stores VTS_MU_AST_ATR #0–#7 RBPs of eight audio streams. Furthermore, each of VTS_MU_AST_ATR is comprised of VTS_MU_AST_ATR (1) of 8 bytes and VTS_MU_AST_ATR(2) of 16 bytes.

The DVD-video disc as described previously records the corresponding data respectively, in the video area, the sub-picture area, and the audio area of the video title set. In this case, the audio data having good quality necessary for the high sampling frequency and the multichannel can be not recorded. Accordingly, the disc according to the embodiment of the present invention records the basic audio data in the audio area of the DVD-video title set, and the extended audio data for embodying the high sound quality by being added to the basic data, is recorded at other video, sub-picture, and private stream areas.

As a result, in the event of recording the audio data in the video area, there are various methods of using a reserved code not to generate the decoding upon the video stream which are applied to the video decoder or of designating the screen size of the size (0*0) that has no standard. Additionally, when recording the audio data at the sub-picture area, there are various methods of using the reserved coding mode not to generate the decoding when the sub-picture stream is recorded at the sub-picture decoder.

FIG. 6A shows the structure of VTS_V_ATR according to the embodiment of the present invention, which is recorded at the RBP 512–RBP 513 of the VTSI_MAT of FIG. 4 in the DVD-audio disc. Then, VTS_V_ATR is represented as the video attribute or the extended audio attribute of the VTSTT_VOBS within the VTS, and the information of the stream within the VTSTT_VOBS is as follows.

Most of all, b15-b14 indicative of the video compression mode and the extended audio mode is given as in the following table 7.

TABLE 7

| b15-b14 | video compression mode |
|---|---|
| 00 | complies with MPEG-1 |
| 01 | complies with MPEG-2 |
| 11 | extended audio data |
| others | Reserved |

As depicted in the foregoing table 7, when the extended audio data is recorded at the video stream, 11 is recorded as the video compression mode. Otherwise, mode values corresponding to the really-used video compression mode is recorded.

b13-b12 of the TV system is given as in the following table 8.

TABLE 8

| b13-b12 | TV system |
|---|---|
| 00 | 525/60 |
| 01 | 625/50 |
| others | reserved | b11-b10 of the aspect ratio is given as in the following table 9.

TABLE 9

| b11-b10 | aspect ratio |
|---|---|
| 00 | 4:3 |
| 11 | 16:9 |
| others | reserved | b9-b8 of the display mode indicate whether or not the display mode for a 4:3 monitor is acknowledged. As stored in the above table 9, when the aspect ratio is "00" (4:3), "11" is recorded. Or, when the aspect ratio is "11" (16:9), "00", "01" or "10" is recorded. The value of the display mode is given as in the following table 10.

TABLE 10

| b9-b8 | display mode |
|---|---|
| 00 | both Pan-scan and letterbox |
| 01 | only Pan-scan |
| 10 | only letterbox |
| 11 | reserved | b7 of line21_switch_1 is given as in the following table 11.

TABLE 11

| b7 | line21_switch_1 |
|---|---|
| 0 | user_data() for line21 data for Field 1 is not recorded in GOP layer of Video stream |
| 1 | user_data() for line21 data for Field 1 is recorded in GOP layer of Video stream | b6 of line 21_switch_2 is given as in the following table 12.

TABLE 12

| b6 | line21_switch_2 |
|---|---|
| 0 | user_data() for line21 data for Field 2 is not recorded in GOP layer of Video stream |
| 1 | user_data() for line21 data for Field 2 is recorded in GOP layer of Video stream | b5-3 of the source picture resolution is given as in the following table 13.

TABLE 13

| b5-b3 | source picture resolution |
|---|---|
| 000 | 720*480 (525/60 system), 720*576 (625/50 system) |
| 001 | 704*480 (525/60 system), 704*576 (625/50 system) |
| 010 | 352*480 (525/60 system), 352*576 (625/50 system) |
| 011 | 252*4240 (525/60 system), 352*288 (625/50 system) |
| others | reserved |

The source picture letterboxed b2 indicates whether or not the video output is letterboxed. As stored in table 14, when the aspect ratio b11-b10 is "01" (16:9), "0" is recorded. Or, when the aspect ratio is "00" (4:3), "0" or "1" is recorded. The value of b2 is given as in the following table 14.

TABLE 14

| b2 | source picture letterboxed |
|---|---|
| 0 | source letterboxed |
| 1 | letterboxed | b0 of the film camera mode indicates the source picture mode for 625/50 system. "0" is recorded when b13-b12 of the TV system are "00" (525/60), while "1" is recorded when b13-b12 thereof are "01" (625/50). b0 value of the film camera mode is given as in the following table 15.

TABLE 15

| b0 | file camera mode |
|---|---|
| 0 | camera mode |
| 1 | file mode |

VTS_SPST_ATRT recorded at RBP 598–RBP 789 of the VTSI_MAT of FIG. 4 is recorded. Herein, VTS_SPST_ATRT is indicative of each of sub-picture stream attributes for the VTSTT_VOBS within the VTS. One VTS_SPST_ATR indicates each of the sub-picture streams. The stream numbers are assigned from 0 depending upon the order represented by the VTS_SPST_ATR. When the address of the sub-picture stream is less than 32, 0 is recorded at all of bits of the non-used VTS_SPST_ATRs. FIG. 6B shows the structure of VTS_SPST_ATR according to the embodiment of the present invention, which is the information recorded at the VTS_SPST_ATR of the DVD-audio.

For the time being, b47-b45 representative of the sub-picture coding mode and the extended audio mode is given as in the following table 16.

TABLE 16

| b47-b45 | sub picture coding mode |
|---|---|
| 000 | Run-length for 2 bits/pixel |
| 001 | reserved (for extended sub picture) |
| 111 | extended audio data |
| others | reserved |

As apparent from the above table 16, in recording the extended audio data at the video stream, 111 is recorded as the sub-picture coding mode. Otherwise, the value corresponding to the really-used sub-picture coding mode is recorded.

b41-b40 of the sub picture type is given as in the following table 17.

TABLE 17

| b41-b40 | sub picture type |
|---|---|
| 00 | Not specified |
| 01 | Language |
| others | reserved |

The specific code as indicated in FIG. 6B is the language code capable of being indicated as the sub-picture, and the specific code and the specific code extension are defined by a separate way.

Figure 7:
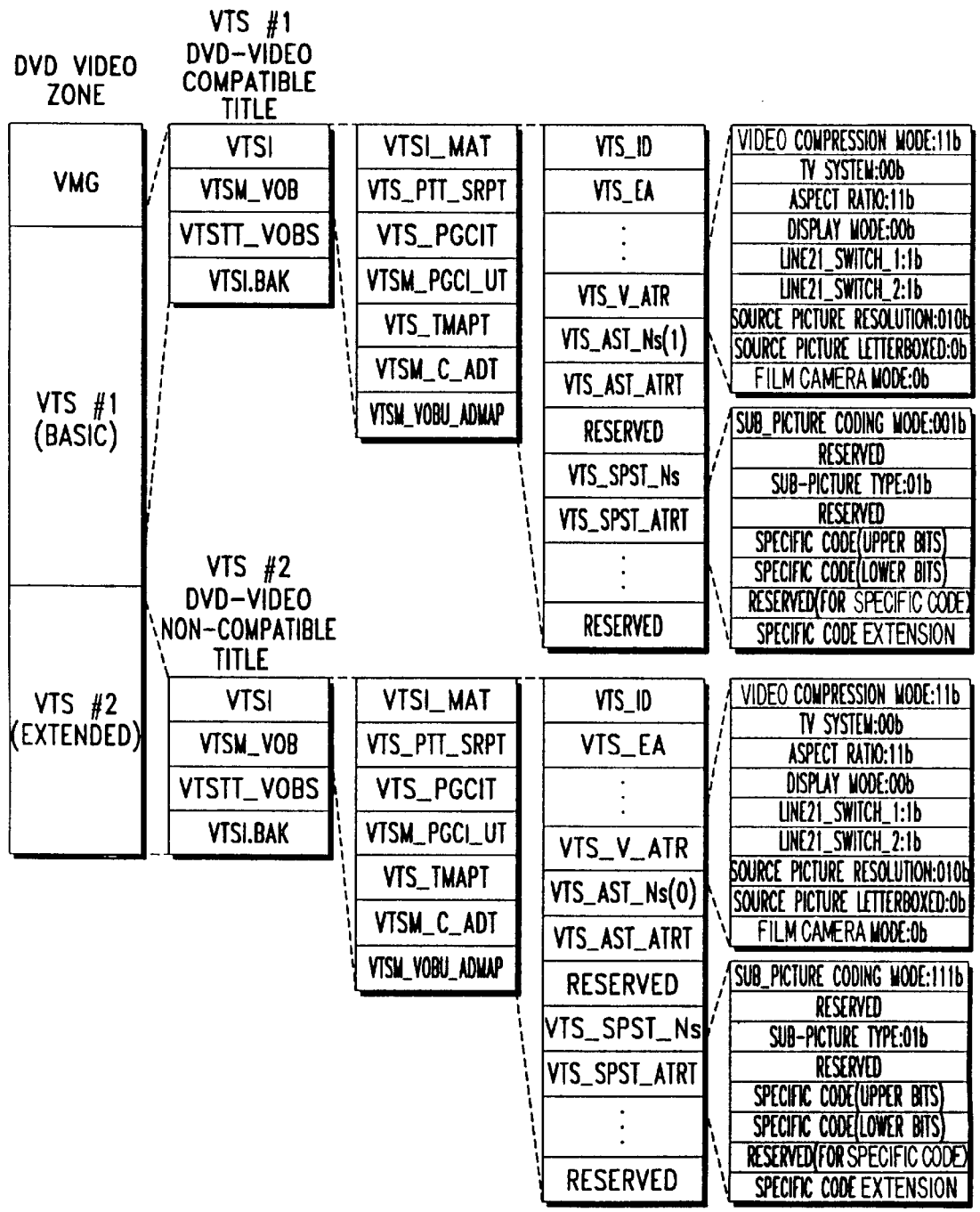
FIG. 7 shows the directory structure in case that an audio title of a basic audio area and an audio title of an extended audio area are separately provided according to the embodiment of the present invention, and the structure of VTSI.

FIG. 7 shows a directory structure in case an audio title of a basic audio area and an audio title of an extended audio area are separately provided according to the embodiment of the present invention, and the structure of the VTSI. In FIG. 7, VTS #1 uses the video stream as the extended audio stream and the sub-picture stream as the original sub-picture stream, and VTS #2 uses the video stream and the sub-picture stream as the extended audio stream.

Figure 8A:
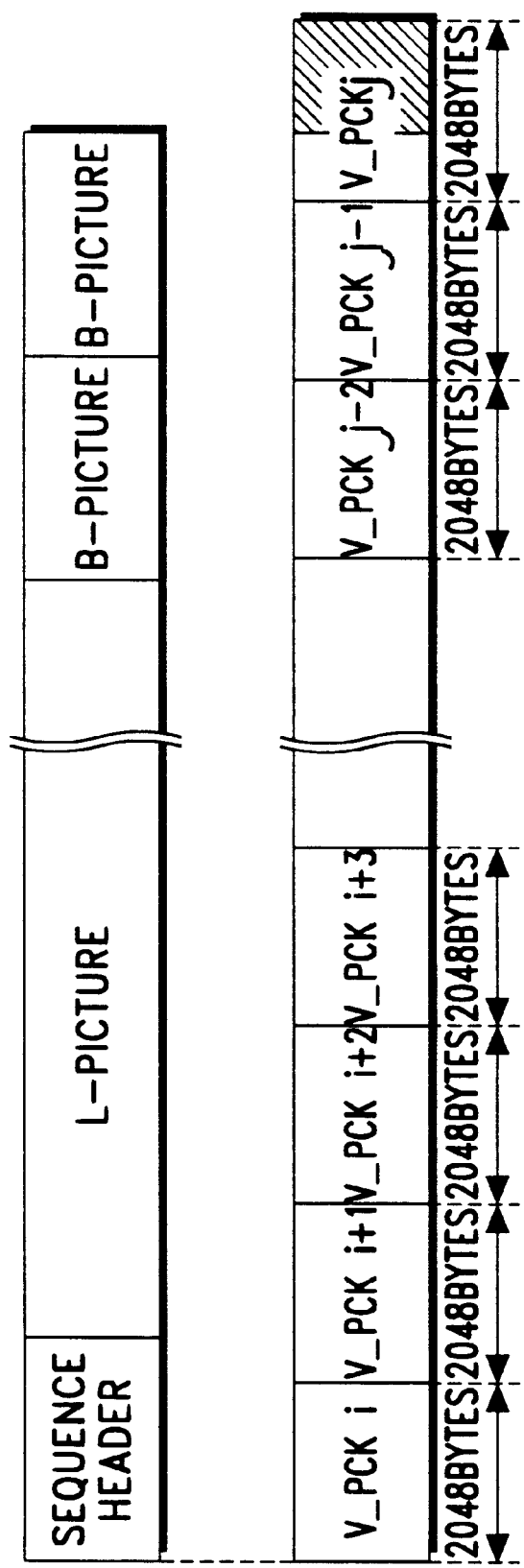
FIG. 8A shows the relation between VOBU and a video pack according to the embodiment of the present invention.
Figure 8B:
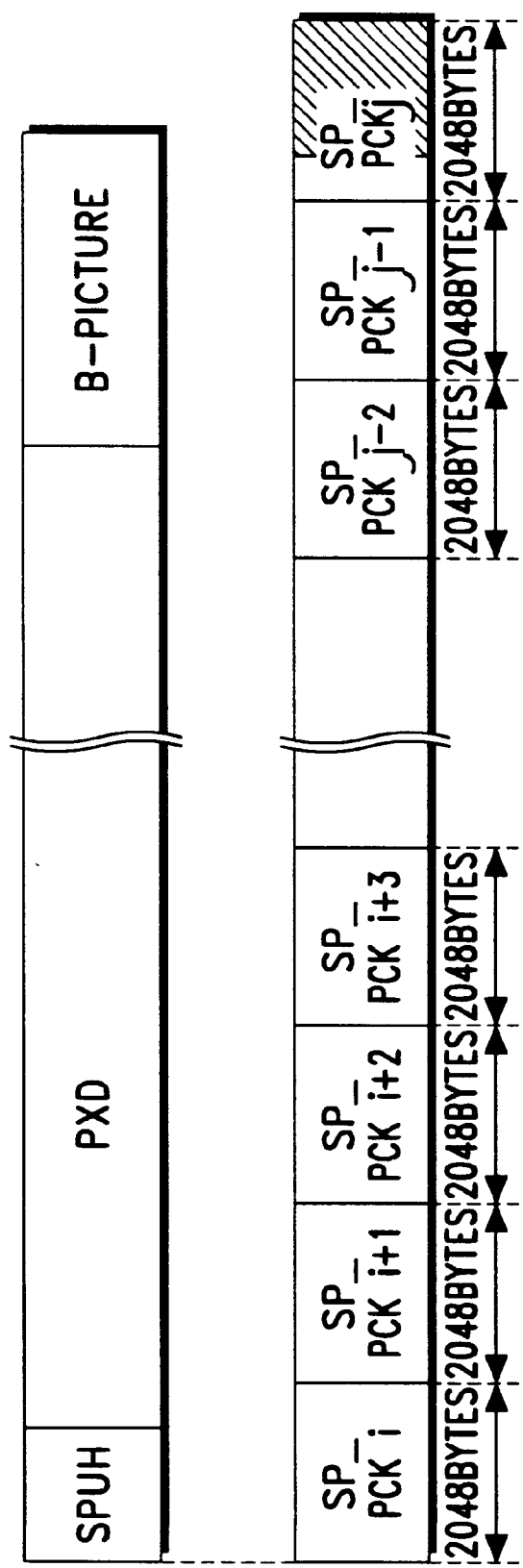
FIG. 8B shows the relation between a header of a sub-picture unit and a sub-picture pack.

VTSI_MAT including VTS_V_ATR and VTS_SPST_ATR as explained above is positioned in the video title set information VTSI of the video title set VTS as shown in FIG. 3. Moreover, the video pack as shown in FIG. 8A as the real data, the sub-picture pack as shown in FIG. 8B, and not-shown audio pack are stored as VTSTT_VOBS of VTS. FIG. 8A shows the relation between VOBU and a video pack and FIG. 8B shows the relation between a header of a sub-picture unit (SPU) and a sub-picture pack. The video pack, the sub picture pack, and the audio pack have, respectively, header information indicating the information of the corresponding pack.

Figure 9:
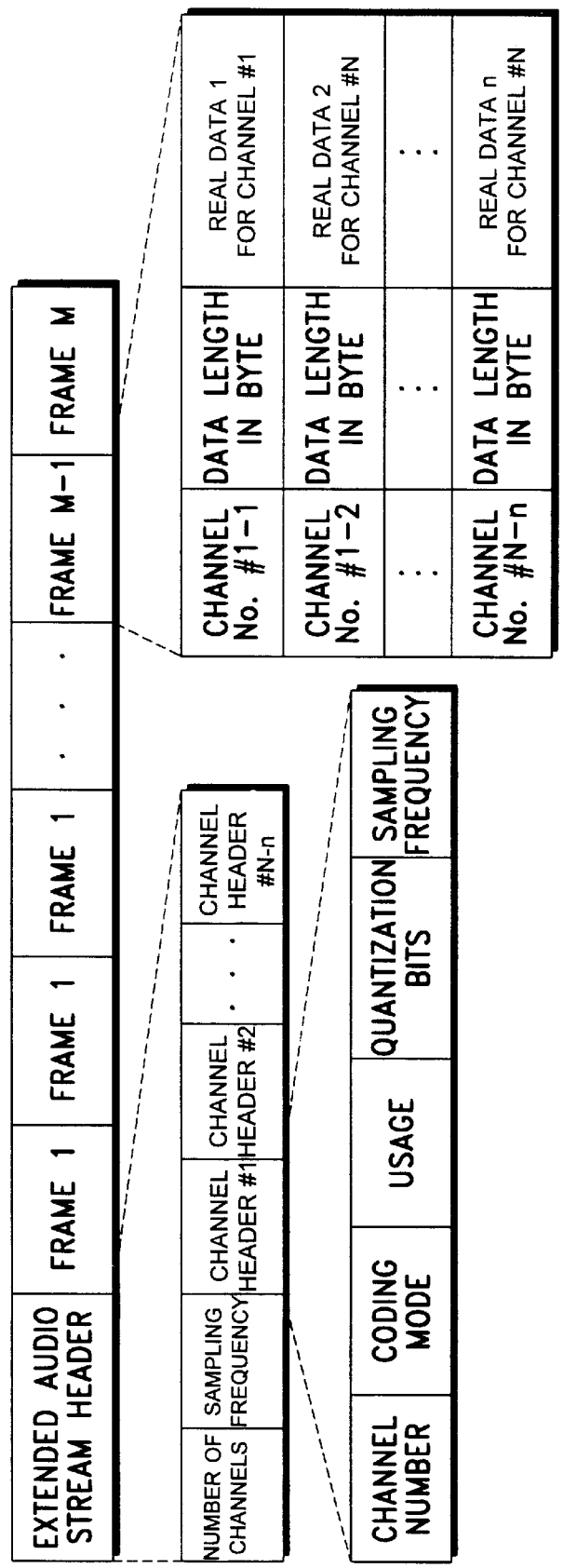
FIG. 9 shows the structure of the extended audio streams for recording the extended audio data according to the embodiment of the present invention.

FIG. 9 shows the structure of the extended audio stream for recording the extended audio data according to the embodiment of the present invention. With reference to FIG. 9, the extended audio streams include one extended audio stream header and M frames.

Here, the extended audio stream header comprises the channel headers corresponding to the number N of channels and information indicative of the number of the channels. The N channel headers further include information such as the channel number of the corresponding channel, the coding mode, the usage, the quantization bits and the sampling frequency.

The channel number of the extended audio channel header includes 4 bits and thereby, can express a maximum of 16 channels of 0000b-1111b.

The coding mode of the extended audio channel header is indicative of the coding mode of the extended audio data and includes 4 bits. The audio coding modes as shown in table 18 can be used in the embodiment of the present invention.

TABLE 18

| | extended audio coding mode |
|---|---|
| 0000 | LPCM |
| 0001 | DTS |
| 0010 | bitstream coding |
| 0011 | lossless coding |
| 0100 | ADPCM |
| 0101 | 8 bit fs |
| others | reserved |

The usage area value of the extended audio channel header has 3 bits, which indicates the usage of the extended audio data recorded at the corresponding channel upon using the extended audio data. Namely, once the usage area value is "000", the extended audio data is the bit extension of the basic audio data. Once the usage value is "001", the sampling frequency of the extended audio data is the bandwidth extension data as two times as the sampling frequency of the basic audio data. When the usage area value is "010", there is the bandwidth extension data that the sampling frequency of the extended audio data is equal to that of the basic audio data. When the usage area value is "011", the extended audio data is the channel extension of the basic audio data, and it is indicated that it is necessary to perform a cross-correlation process with the basic audio channel for reproducing. When the usage area value is "100", it is indicated that the basic audio channel and the extended audio channel are simply additionally reproduced. The usage area value is given as in the following table 19.

TABLE 19

| | usage |
|---|---|
| 000 | bit extension |
| 001 | high-band-only bandwidth extension |
| 010 | 2-band representation bandwidth extension |
| 011 | channel extension to be cross-correlated |
| 100 | simple channel extension |
| others | reserved |

The quantization bits of the extended audio channel header includes 5 bits, which are given as in the following table 20.

TABLE 20

| | quantization bits |
|---|---|
| 00000 | not meaningful (in case data compression coding scheme is used) |
| 00001–01000 | 16bit - 8bit |
| 10000–11000 | 16bit - 24bit |
| others | reserved |

The sampling frequency of the extended audio channel header is comprised of 3 bits, which is given as in the following table 21.

TABLE 21

| | sampling frequency |
|---|---|
| 000 | 48KHz |
| 001 | 96KHz |
| 010 | 192KHz |

TABLE 21-continued

| | sampling frequency |
|---|---|
| 011 | 384KHz (8 fs) |
| 100 | 3.702Mhz (64 fs) |
| others | reserved |

In the embodiment of the present invention, the disc for recording the extended audio data in the video pack of the DVD-video disc and/or the sub-picture pack thereof is referred to as the DVD-audio disc (the DVD-audio disc having audio data stored in the sub-picture and/or video pack and the DVD-video disc does not). Various methods are used for recording the extended audio data. As shown in FIG. 9, the extended audio data is divided into the header and the real data, and the real audio data is divided into frames.

To record the whole stream in the disc, the same method as that of the DVD-video is used. In the case that the video stream stores the extended audio data, the extended audio data is really stored in the video pack. In the case that the sub-picture stream stores the extended audio data, the audio data is actually stored in the sub-picture pack.

Figure 10A:
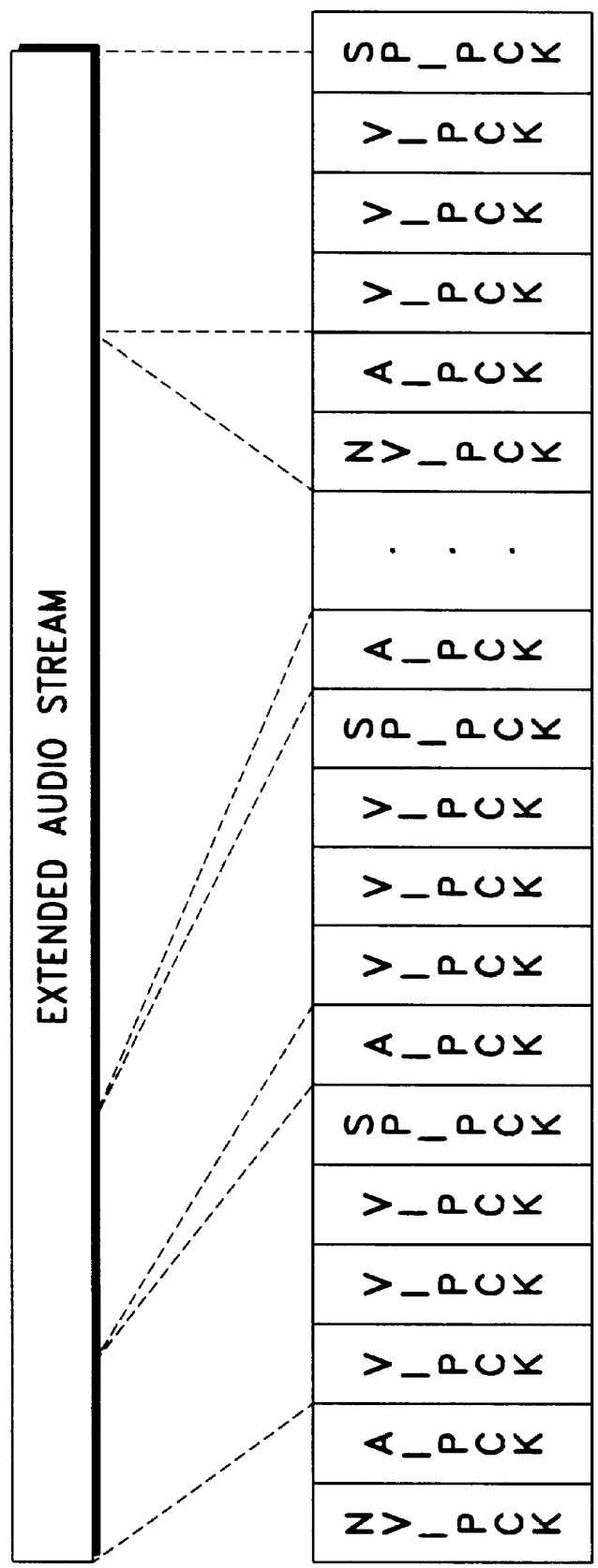
Figure 10B:
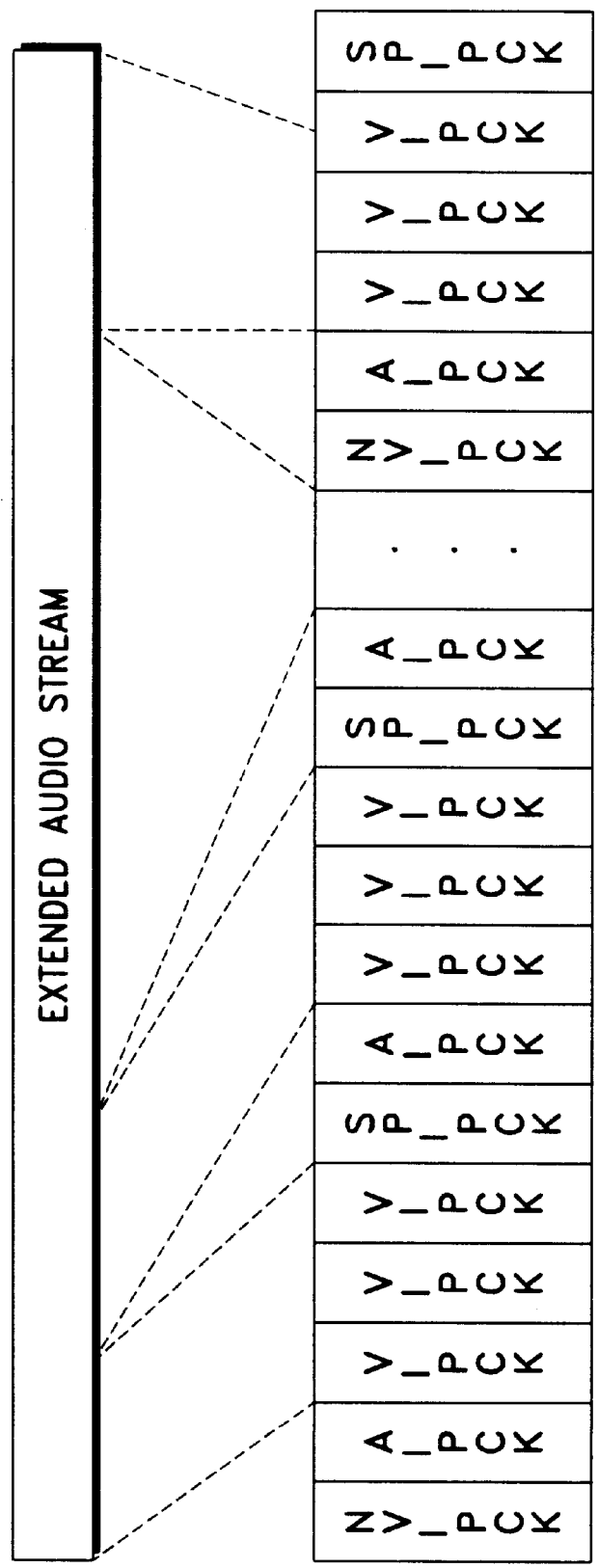
Figure 10C:
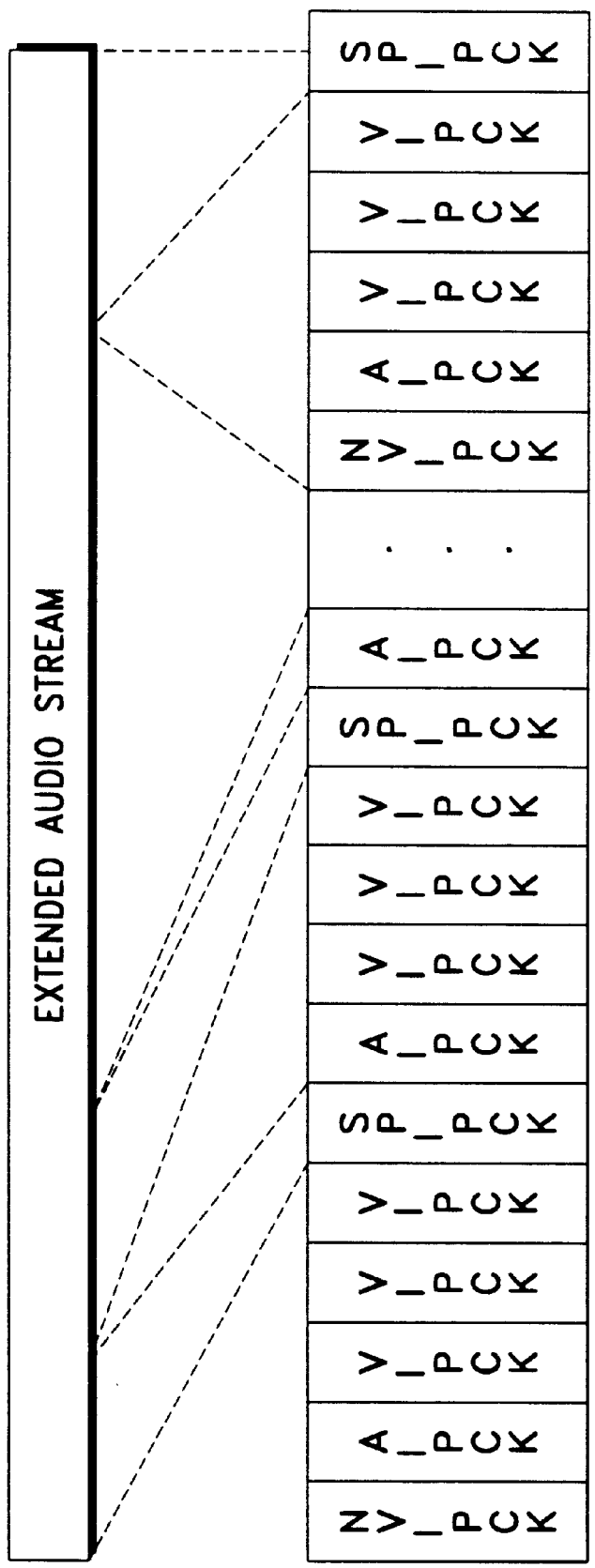

FIGS. 10A to 10C show examples of the structure of the physical data of the extended audio stream, wherein FIG. 10A is a diagram illustrating the format that the extended audio stream is recorded in the video area and the sub-picture area, FIG. 10B is a diagram illustrating the format that the extended audio stream is recorded in the video area, and FIG. 10C is a diagram illustrating the format that the extended audio stream is recorded in the sub-picture area. As depicted in FIGS. 10A to 10C, the extended audio data can be recorded by selectively using only one stream of two streams of the video stream and the sub-picture stream or using both of the two streams. At this time, upon using two streams as the extended audio data, the synchronization of the pack uses the PTS.

The data of the extended audio data stream is made by sequentially combining the packs. The data within the frames is stored by being separated by the channel, and the stream header records information just like whole information, the coding system of each channel, and the usage method. When using the extended audio data with the method as shown in FIG. 9, the bit extension data (0.7 Mbps) of 4 bits at LPCM (3.75 Mbps) of 48 KHz and 20 bits having 4 channels of the basic area, 48 KHz–96 KHz and 24 bits bandpass extension data (1.125 Mbps) which is compressed by DTS (Digital Theater Systems), and 96 KHz and 24 bits extension 2 channel data (1.125 Mbps) fullpass-recorded with DTS, are added, thereby recording the value of each channel header as in the following table 22.

TABLE 22

| channel # | coding mode | usage | # of bits | fs | etc. |
|---|---|---|---|---|---|
| 0000 | 0000 | 000 | 00100 | 000 | note1 |
| 0000 | 0001 | 010 | 00000 | 000 | note2 |
| 0001 | 0000 | 000 | 00100 | 000 | note3 |
| 0001 | 0001 | 010 | 00000 | 000 | note4 |
| 0010 | 0000 | 000 | 00100 | 000 | note5 |
| 0010 | 0001 | 010 | 00000 | 000 | note6 |
| 0011 | 0000 | 000 | 00100 | 000 | note7 |
| 0011 | 0001 | 010 | 00000 | 000 | note8 |
| 0100 | 0001 | 011 | 00000 | 001 | note9 |
| 0101 | 0001 | 011 | 00000 | 001 | note10 |

In regard to the above table 22, note 1–note 10 are as follows: note 1 indicates the bit extension of channel 0 as 48 KHz, 4 bits LPCM; note 2 indicates 48 KHz–96 KHz bandwidth extension of channel 0 as 48 KHz DTS; note 3 indicates the bit extension of the channel 1 as 48 KHz, 4 bits LPCM; note 4 indicates 48 KHz–96 KHz of the channel 1 as 48 KHz DTS; note 5 indicates the bit extension of the channel 2 as 48 KHz, 4 bits LPCM; note 6 indicates 48 KHz–96 KHz bandwidth extension of the channel 2 as 48 KHz DTS; note 7 indicates the bit extension of the channel 3 as 48 KHz, 4 bits LPCM; note 8 indicates 48 KHz–96 KHz bandwidth extension of the channel 3 as 48 KHz DTS; note 9 indicates the channel extension of the channel 4 as 96 KHz DTS; and note 10 indicates 96 KHz channel extension of the channel 5 as 96 KHz DTS.

The device for reproducing the DVD-audio disc is constructed with a basic audio decoder for reproducing the audio of the basic area and an extended audio decoder for reproducing the audio of the extended area, which combines the audio data decoding-output in the two audio decoders as explained hereinbefore, thereby reproducing the audio at high capacity and high sound quality. The extended audio data is recorded in the video area, the sub-picture area, or another stream, or in all of the areas.

Therein, the basic audio data is capable of being recorded with the system such as LPCM, AC-3, MPEG-2, DTS, and SDDS regulated in the DVD-video, wherein the sound quality should be high in accordance with LPCM. At present, it has been well-known that the LPCM and DTS having the capacity of 24 bits is suitable for recording a music signal.

The extended audio data is added to the signal recorded in the basic area, to enhance the capacity or to provide the music of the same content as that of the basic area at high resolution, wideband, and multichannel. In case of providing the same audio as that of the basic area, the extended audio data is recorded as another title, so that the extended audio data can be played by itself. Upon usage with being combined with the basic area, the extended audio data can be used to increase the number of the quantization bits of the signal recorded at the basic area or to increase the bandwidth, and to record the data of the sub-channel which is not recorded in the basic area. The data belonging to the above are can use others systems except for LPCM and DTS and other systems can support the sound quality characteristic in conformity with LPCM.

The extended audio data is recorded by being divided into the format designation and the real data. The extended data can be recorded by the channel and by the bandpass. The content of the extended audio data is divided as below. Firstly, on increasing the number of the bits, the extended area data is comprised of lower bits which can not be recorded in the basic area at a maximum of 24 bits. Secondly, on extending the bandwidth, the high-pass component is recorded or the signal of the channel which is not included in the basic area is recorded throughout all of bandpass using the system of recording the only bandpass which is not included in the basic area, as the high sampling frequency, or with using 2-bands expression method using a perfect reconstruction FIR filter.

The DVD-audio can record the basic audio data and the extended audio data in the single title set as stated previously. Also, the audio data including only other extended audio data can be stored in another title. As illustrated in FIG. 7, two title sets are registered in the video title directory VIDEO_TS and VTS of each title set includes information for the attributes of VTS_SPST_ATR and VTS_V_ATR. The field includes the information for the video and sub-picture streams. Here, in the event of recording the extended audio data in the video stream, 11b is recorded in the video compression mode area of the VTS_V_ATR. However, in the event of recording the extended audio data in the sub-picture stream, 111b is recorded in the sub-picture coding mode area.

Hereinafter, when the VTS information is read for reproducing the title, since various information of each stream is recorded, the device for reproducing the DVD audio instructs operations of each of the decoders during a time when the corresponding title is reproduced. Accordingly, before reproducing the title, the coding mode information of the video stream and the sub-picture stream are read to set the operation modes of each decoder. At this moment, as shown in FIG. 7, the basic audio data is 6 channels, 48 KHz, 20 bits multichannel LPCM (5.6 Mbps), and 4 Mbps extended audio data and the sub-picture can be recorded in the title. Unlike that, 192 KHz, 24 bit, 8 channels DTS stream (9 Mbps) as other title is recorded in the video stream and the sub-picture stream. In FIG. 7, two VTSs are registered in the VIDEO_TS. In the reproducing device having a DTS decoding function, a user can reproduce the title in which the DTS stream is recorded, or the title including the basic/extended LPCM. Without a DTS decoding function, the user can hear the title only by reproducing the title recorded with the LPCM. If the device for reproducing the DVD video reproduces the title including DTS, the screen picture is provided without a title.

A high sound quality reproducing method according to the embodiment of the present invention is used by combing the extended audio data with the basic audio data, which is largely divided into the bit extension, the frequency bandwidth extension, and channel extension.

Once a signal of the basic area is recorded as the quantization bits less than 24 bits, a non-recorded lower bit is recorded as the bit extension method. Upon reproducing, the data reproduced at the basic audio area is output as the upper bit and the data reproduced at the extended audio area is output as the lower bit, so that two pieces of data can be combined with each other to thereby be reproduced.

Figure 11:
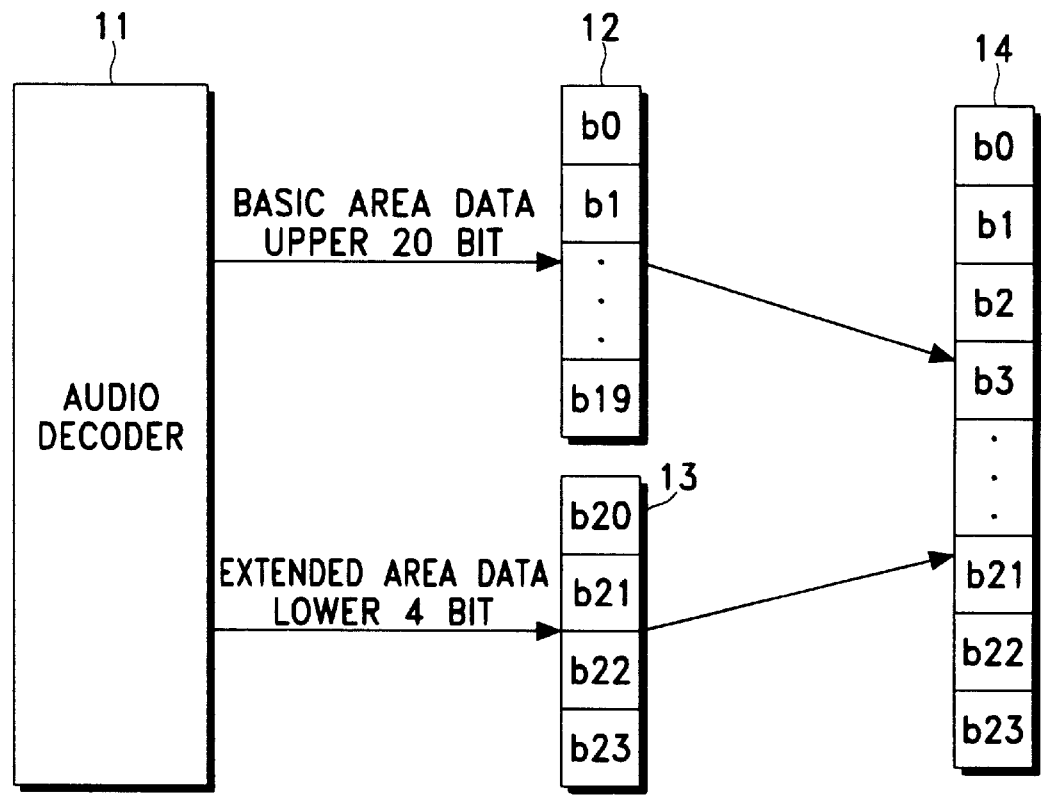
FIG. 11 shows the method for combining the basic area data and the extended area data in the audio decoder and increasing the number of bits according to the embodiment of the present invention.

FIG. 11 shows a method for combining the basic area data and the extended area data in an audio decoder and increasing the number of bits according to the embodiment of the present invention. In FIG. 11, the basic audio data is the audio data of 20 bits and the extended audio data is the audio data of 4 bits. In FIG. 11, the 20 bits basic audio data of the basic audio area output from an audio decoder 11 is applied to a first buffer 12 having 20 bits size, and the 4 bits extended audio data of the extended audio area is applied to a second buffer 12 having the 4 bits size. After that, since a third buffer 14 having 24 bits size stores the basic audio data of 20 bits output at the first buffer 12 at the upper bit area and the extended audio data of 4 bits output in the second buffer 13 as the lower bit area, the third buffer 14 combines the basic audio data and the extended audio data with each other as the audio data of 24 bits. Following that, because the combined 24 bits audio data is output by controlling the third buffer 14, the number of the bits is extended. Specifically, although the 24 bits audio data can not be recorded at the basic audio data area due to the bit ratio limit of the multichannel bit ratio, a bit extension method can reproduce the audio data of good quality by storing the extended audio data in the lower bit area.

The above frequency bandwidth extension method is used upon combining the audio signals at high-pass and low-pass and is mainly divided into two. Firstly, a first frequency bandwidth extension method is to oversample the data of the basic audio area to conform the data of the basic audio area and the data of the extended audio area with each other and to combine the oversampled data with the data of the extended audio area. Next, a second frequency bandwidth extension extends the bandwidth by using a perfect reconstruction FIR filter as the data of the 2 band expression system.

Figure 12A:
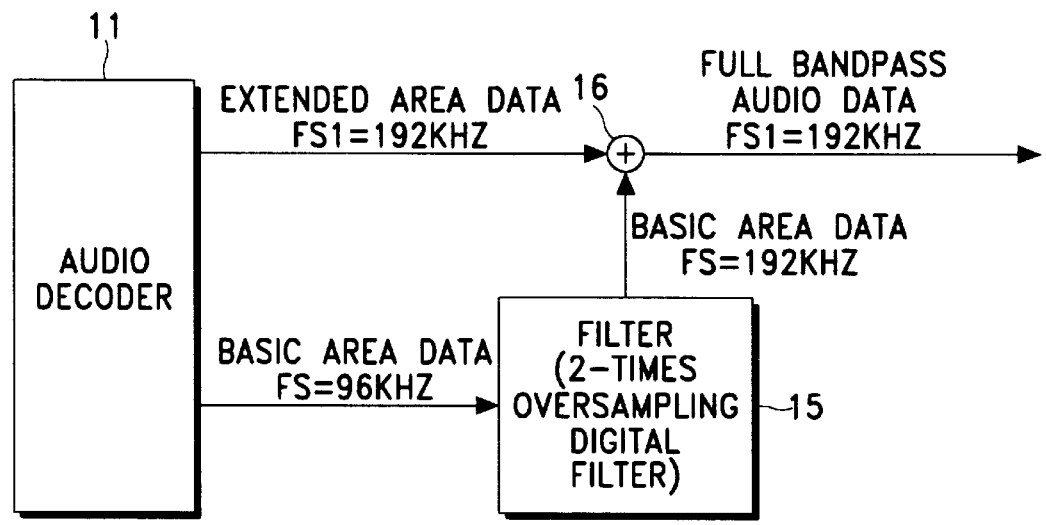
FIG. 12A shows the method for at the audio decoder, frequency-converting the basic area data at the audio decoder, combining the frequency-converted data with high-pass of the extended area, and extending the bandpass according to the embodiment of the present invention.

FIG. 12A shows the method of frequency-converting the basic area data at the audio decoder, combining the frequency-converted data with high-pass of the extended area, and extending the bandpass according to the embodiment of the present invention, which assumes the case where the data of the basic audio area has 96 KHz sampling frequency and the data of the extended audio area has 192 KHz sampling frequency. Centering around FIG. 12A, if the audio decoder 11 outputs the 96 KHz sampling data of the basic audio area, a 2-times oversampling digital filter 15 2-times oversamples the basic audio data, converts the oversampled data into the audio data of 192 KHz, and outputs the converted data. Also, an adder 16 adds the oversampled 192 KHz basic audio data to the 192 KHz extended audio data of the extended audio area output from the audio decoder 11, thereby outputting the full bandpass audio data of 192 KHz. As mentioned hereinbefore, in the first frequency extension method, the data of the extended audio area records the data of the extended audio area having the 2-times sampling frequency of the basic audio data when the data of the basic audio area has the low sampling frequency. Upon reproducing, the basic audio data is combined with the extended audio data after 2-times oversampling of the basic audio data, thereby extending the bandwidth.

Figure 12B:
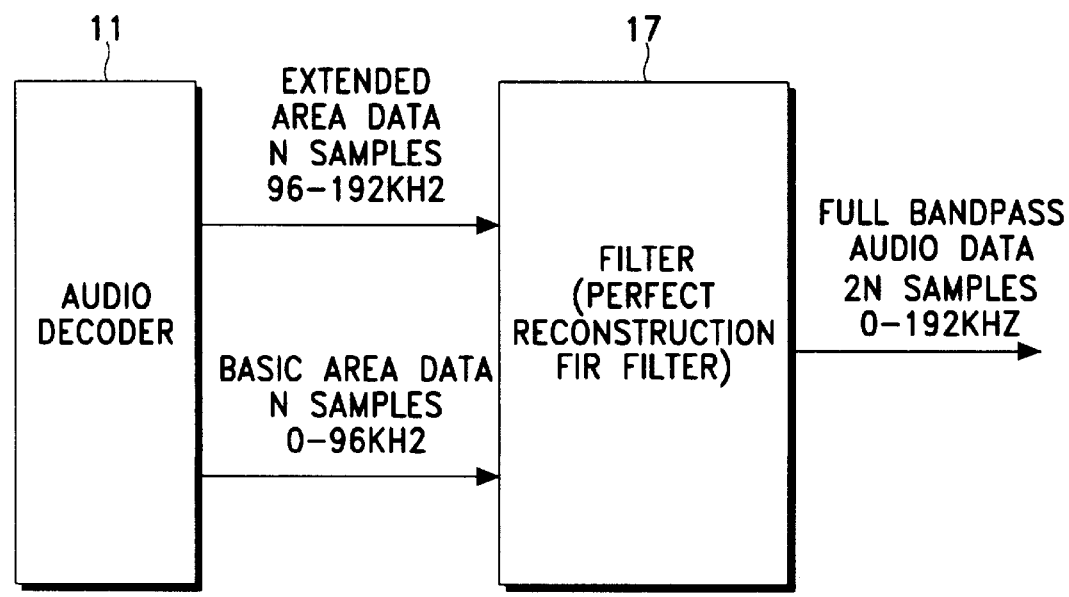
FIG. 12B shows the method for combining the basic area data and the extended area data expressed as 2-bands at the audio decoder and extending the bandpass according to the embodiment of the present invention.

FIG. 12B shows the method for combining the basic area data and the extended area data expressed as 2-bands at the audio decoder and extending the bandpass according to the embodiment of the present invention. Therein, the basic audio data is N sample audio data of 0–96 KHz and the extended audio data is N sample audio data of 96–192 KHz. With reference to FIG. 12B, the audio decoder 11 outputs the basic audio data of 0–96 KHz and the extended audio data of the 96 KHz–192 KHz N samples. Thus, the perfect reconstruction FIR filter 17 combines the basic audio data and the extended audio data output from the audio decoder 11, outputs the full bandpass audio data of 2N samples, and extends the bandwidth.

The channel extension method is included with first channel extension method by cross-correlation processing the channel of the basic area and the added channel so as to remove the channel of the extended audio data already-combined at the basic audio data, and second channel extension method for additionally reproducing simply new channel.

Figure 13A:
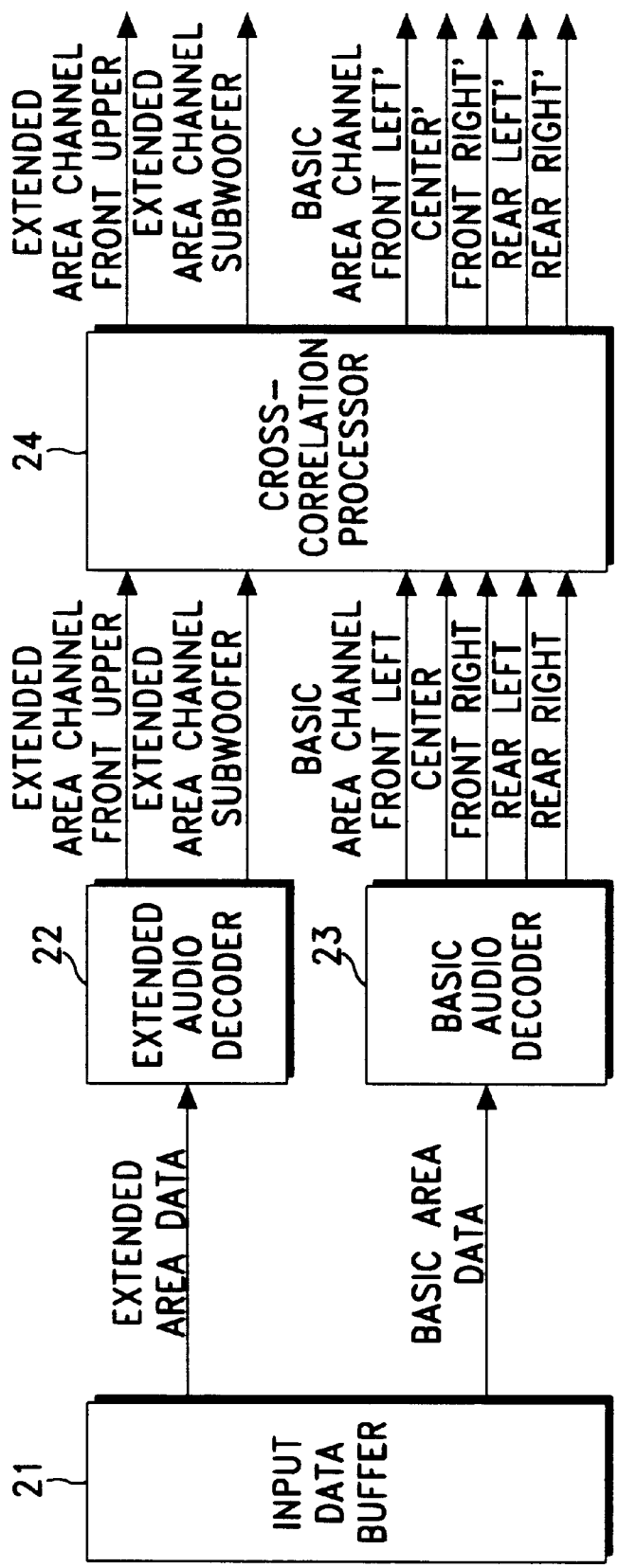
Figure 13B:
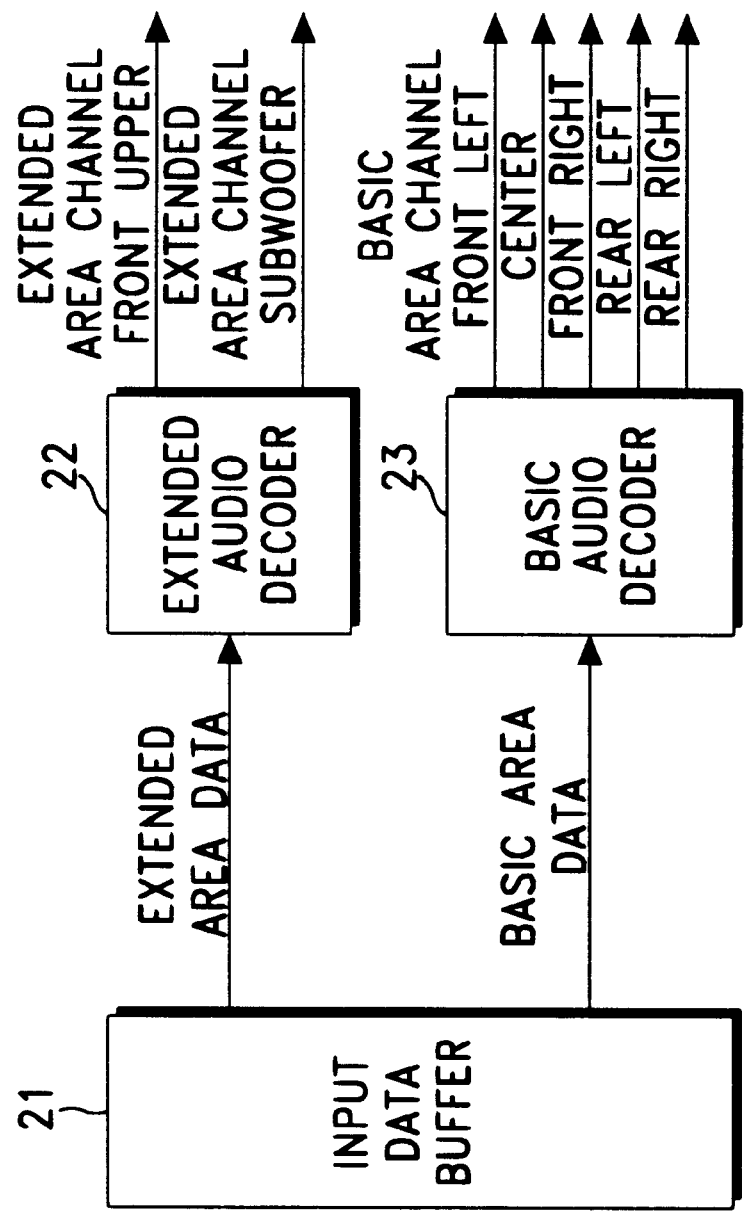

FIGS. 13A and 13B show the reproducing examples of the case that the effect channel is recorded in the extended area, wherein FIG. 13A is the process of separating an original basic signal by using the basic channel and the extended channel. In FIG. 13A, the channel of the basic audio data is 5 channels and the channel of the extended audio data is 2 channels. Referring to FIG. 13A, an input data buffer 21 buffers and outputs the reproduced data of the basic audio area and the extended audio area. In this case, a basic audio decoder 23 outputs the audio data of 5 channels (front, left, center, front right, rear left, and rear right) of the basic audio data. As well, an extended audio decoder 22 outputs the audio data of 2 channels (front upper and subwoofer) of the extended audio data. Then, after receiving the audio data of the 7 channels output in the extended audio decoder 22 and the basic audio decoder 23, a cross-correlation processor 24 cross-correlates the channel of the basic area and the added channel, thereby extending the channel while removing the audio signal of the extended channel combined at the basic data.

FIG. 13B is the process of intactly reproducing the basic channel and the extended channel. In FIG. 13B, the channel of the basic audio data is 5 channels and the channel of the extended audio data is 2 channels. Referring to FIG. 13B, the input data buffer 21 buffers and outputs the reproduced data of the basic audio area and the extended audio area. In this case, the basic audio decoder 23 outputs the audio data of 5 channels (front, left, center, front right, rear left, and rear right) of the basic audio data. As well, the extended audio decoder 22 outputs the audio data of 2 channels (front upper and subwoofer) of the extended audio data. The second channel extension method intactly outputs the audio data of the channel of the basic area and the added channel.

The device for using the DVD-audio as described above can be replaced with a device for combining a general DVD-video and the DVD-audio according an embodiment of the present invention and the DVD-audio private reproducing device.

Figure 14:
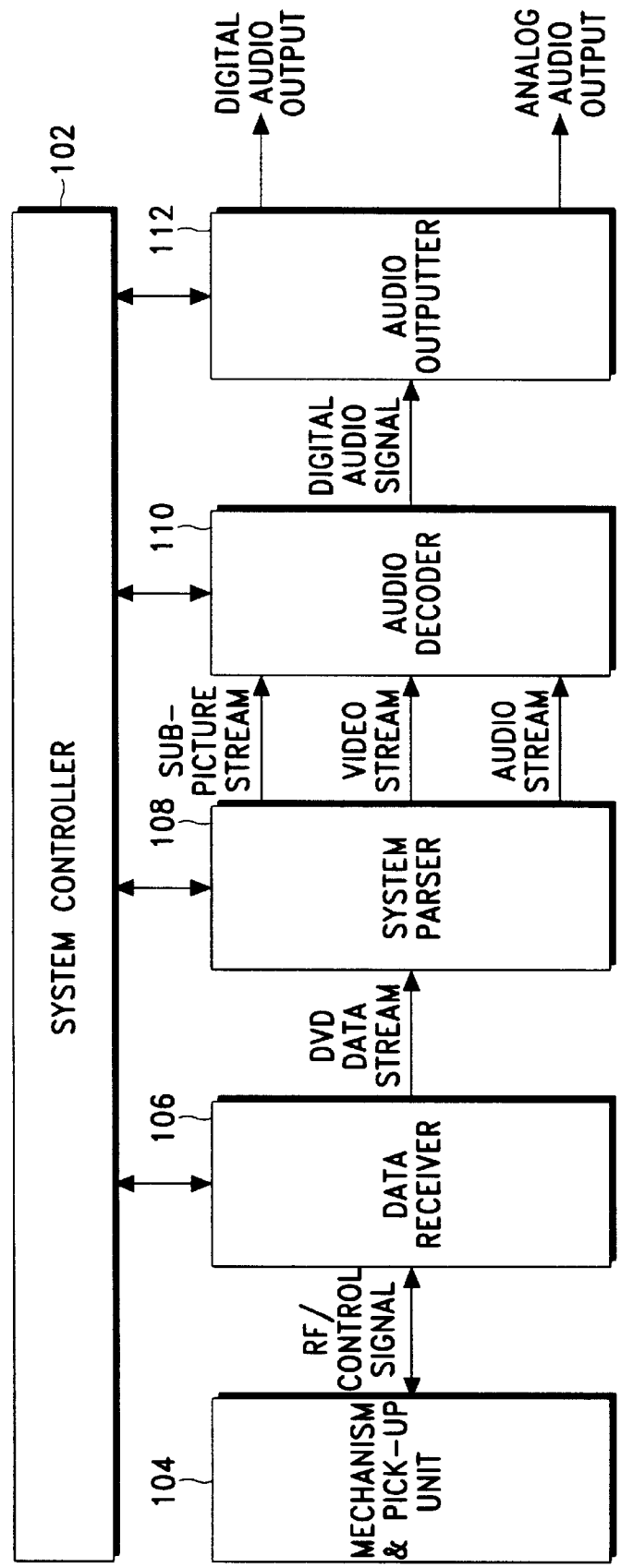
FIG. 14 shows the structure of privately reproducing only a DVD-audio disc without expression of moving picture according to the embodiment of the present invention.

FIG. 14 shows the structure of privately reproducing data from only a DVD-audio disc without expression of a moving picture according to the embodiment of the present invention. In FIG. 14, a system controller 102 controls overall operations of the DVD-audio disc reproducing device and performs the user interface function. The system controller 102 analyzes the video title set information VTSI and judges DVD-video and DVD-audio. At this point, the system controller 102 analyzes the coding mode of the VTS_V_ATR and VTS_SPST_ATR in the information of the VTSI and, upon recording the extended audio data at one stream of the video stream and the sub-picture stream, judges that the DVD-audio exists, thereby controlling the reproducing function of the DVD-audio. However, when the bit stream and the sub-picture stream are in the state where the extended audio data is not recorded, the system controller 102 judges that the DVD-video exists, thereby performing the reproducing operation of the audio data recorded at the basic audio data.

A mechanism & pick-up unit 104 reads the data recorded on the DVD-audio disc. A data receiver 106 analyzes and corrects the error of the audio data output from the mechanism & pick-up unit 104. The data receiver 106 includes an error correction circuit (hereinafter, referred to as ECC). A servo controller for performing all kinds of servo functions by controlling the driving of the mechanism & pick-up unit 104 under the control of the system controller 102 is omitted in FIG. 14.

A system parser 108 separates the sub-picture stream, the video stream and the audio stream in the DVD data streams output from the data receiver 106 under the control of the system controller 102 and outputs the separated stream. An audio decoder 110 includes a basic audio decoder and an extended audio decoder. The audio decoder 110 receives the sub-picture stream, the video stream, and the audio stream, output from the system parser 108, decodes the basic audio data and the extended audio data by enabling corresponding decoders under the control of the system controller 102, combines the decoded audio data and the extended audio data, and outputs the combined data as the digital audio data.

An audio outputter 112 converts the inputted data into the digital audio data and the analog audio signal according to the characteristic of the device for reproducing the data with input of the decoded audio data output in the audio decoder 110 and outputs the converted data.

Regarding the construction of FIG. 14, there is the case where the sub-picture stream and the video stream are used as the extended audio stream. However, in the case of using the video stream as the extended audio stream and the sub-picture stream as the sub-picture data of the reproduced audio, another sub-picture decoder for decoding the sub-picture stream should be additionally included in the device according to the present invention, except for the audio decoder 110. Then, the sub-picture data can be the language information for the audio reproduced.

Figure 15:
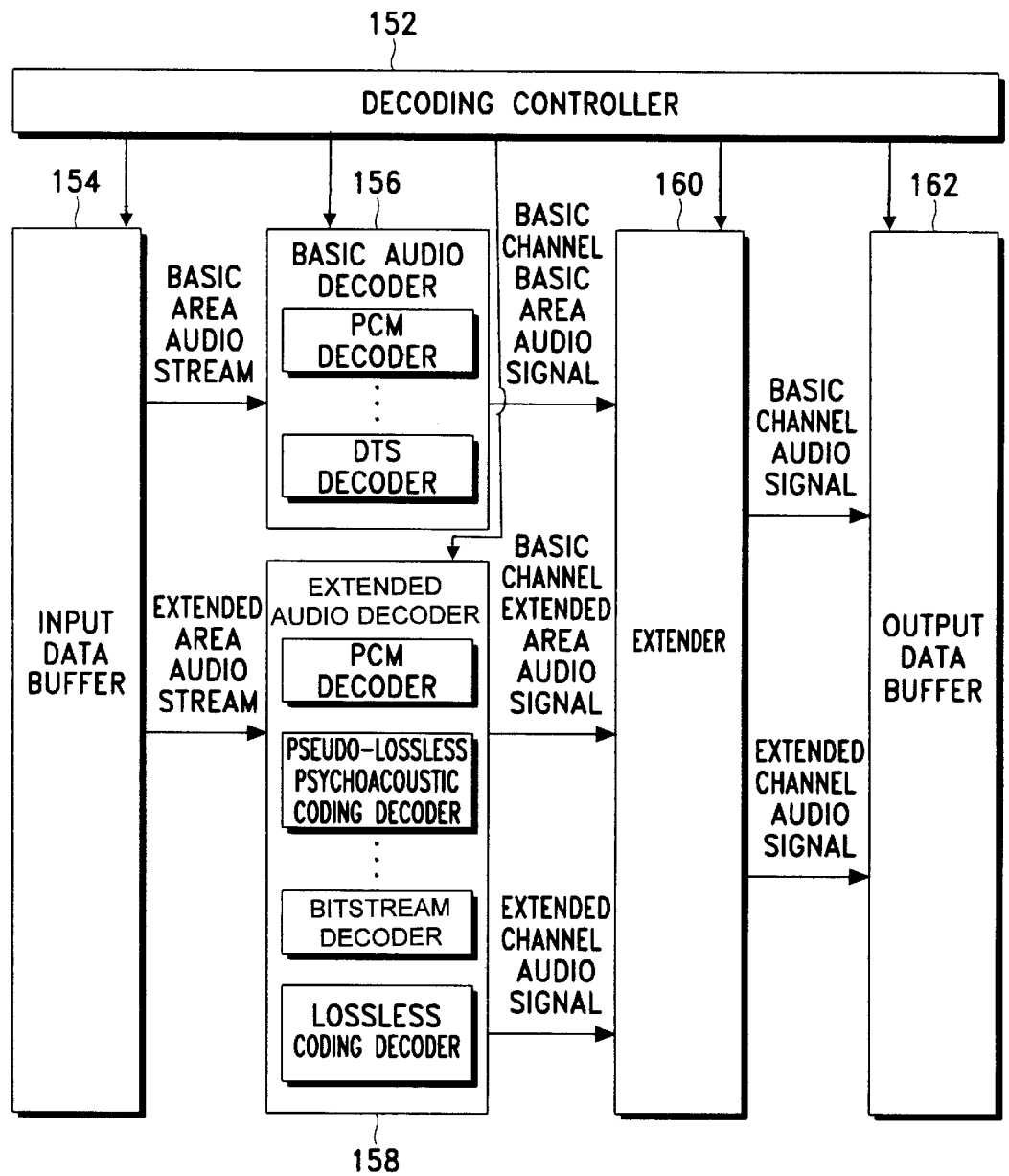
FIG. 15 shows the structure of the audio decoder for decoding the audio data recorded at the disc in the DVD audio private reproducing device of FIG. 14.

The audio decoder 110 further includes the basic audio decoder and the extended audio decoder so as to decode the basic audio data and the extended audio data according to the embodiment of the present invention, as illustrated in FIG. 15. FIG. 15 shows the structure of the audio decoder 110 for decoding the audio data recorded on the disc in the DVD audio private reproducing device of FIG. 14.

With reference to FIG. 15, an input data buffer 154 inputs the sub-picture stream data, the video stream data, and the audio stream data output from the system parser 108, outputs the sub-picture stream data and the video stream data as the extended audio stream, and stores the audio stream data in the basic audio stream.

A basic audio decoder 156 includes the decoders corresponding to the coding modes of the audio data recorded in the audio stream of the DVD-audio. The basic audio decoder 156 is composed of LPCM decoder and DTS decoder (option) depending on the audio decoding mode of the DVD-video. The basic audio decoder 156 inputs the audio stream of the basic audio area output from the input data buffer 154, and decoding-outputs the basic audio data input by driving the decoder corresponding to the audio coding mode of the basic audio stream by the control of a decoding controller 152.

An extended audio decoder 158 includes the decoders corresponding to the coding modes of the audio data recorded at the extended audio stream of the DVD-audio. The extended audio decoder 158 can further have a pseudo-lossless psychoacoustic coding decoder, a bitstream decoder and a lossless coding decoder. The extended audio decoder 158 inputs the audio stream of the extended audio area output from the input data buffer 154 and decoding-outputs the extended audio data input by driving the decoder corresponding to the audio coding mode of the extended audio stream under the control of the decoding controller 152.

The extender 160 analyzes the usage value positioned in the corresponding channel header of the extended audio data output from the extended audio decoder 158 and the basic audio data output from the basic audio decoder 156 and performs the functions such as bit extension, the bandwidth extension, and the channel extension. The bit extension method is performed by combining the data of the basic audio area and the data of the extended audio area as shown in FIG. 11 and extending the number of the bits. The bandwidth extension method is performed by frequency-converting the data of the basic audio area, combining the frequency-converted data with the high-pass audio data of the extended audio area and extending the bandwidth as shown in FIG. 12A, or by combining the data of the basic audio area having the 2 bands expression system with the audio data of the extended audio area and extending the bandwidth as shown in FIG. 12B. The channel extension method is performed to cross-correlation process the channel of the basic audio data and the channel of the extended audio data, thereby removing the signal of the channel of the extended audio data combined with the basic audio data as shown in FIG. 13A, or intactly reproducing the channel of the basic audio data as the channel of the extended audio data as shown in FIG. 13B. In this case, the extender 160 becomes a bit/bandwidth/channel extender, which inputs the basic audio data of the basic channel output from the basic audio decoder 156 and the extended audio data of the basic channel output from the extended audio decoder 158 and combines two types of audio data, so that the output audio data can be output after the bit extension or/and the bandwidth extension.

An output data buffer 162 inputs and stores the audio data output from the extender 160.

The decoding controller 152 generates control signals for controlling operation for all of components of the audio decoder 110 under the control of the system controller 102.

Figure 16:
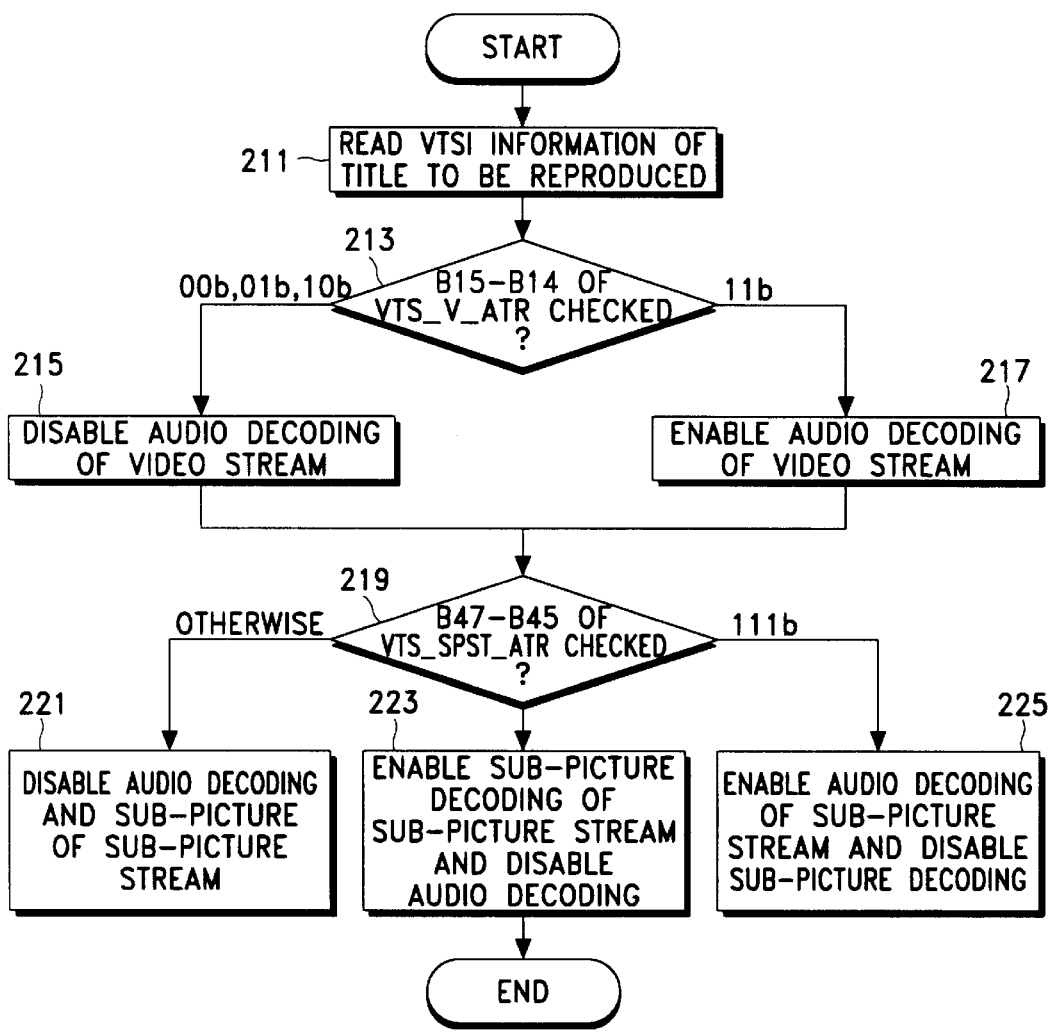
FIG. 16 is a flow chart illustrating the process of initializing the audio decoder to reproduce the title in the DVD-audio private reproducing device having the same structure as that of FIG. 14.

FIG. 16 is a flow chart illustrating the process of initializing the audio decoder to reproduce the title in the DVD-audio private reproducing device having the same structure as that of FIG. 14. In regard of FIG. 16, in the reproducing mode, the system controller 102 drives the mechanism & pickup unit 104 and reads the VTSI information of the title to be reproduced in the data read from the disc in step 211. After that, in step 213, the system controller 102 analyzes the attribute information of the video stream after reading b15-b14 of VTS_V_ATR of VTSI_MAT. At this point, the VTS_V_ATR has the construction equal of that of FIG. 6A, and the value of b15-b14 becomes the video compression mode information. In this event, when the value of b15-b14 is "11", it is checked that the extended audio mode exists. But, when b15-b14 has other values except for "11", it is checked that the extended audio mode did not exist. Therefore, when the value of b15-b14 of VTS_V_ATR is "11", the system controller 102 proceeds to step 217, thereby controlling the system parser 108 and the audio decoder 110 to enable the audio decoding of the video stream. However, when checked in the above step 213 that the value of b15-14 of VTS_V_ATR is one of "00", "01", and "10", the system controller 102 proceeds to step 215, thereby controlling the system parser 108 and the audio decoder 110 to disable the audio decoding of the bit stream.

After performing the foregoing step 215 or 217, in step 219, the system controller 102 analyzes the attribute information of the sub-picture stream by reading b47-b45 of VTS_SPST_ATR of the VTSI_MAT. In this instance, VTS_SPST_ATR has the construction equal to that of FIG. 6B, and the value of b47-b45 becomes the sub-picture coding mode information. In this event, when the value of b47-b45 is "111", it is checked that the extended audio mode exists. But, when the value thereof is "000", it is checked that the sub-picture mode exists. Also, when b47-b45 has other values except for "000" and "111", it is checked that the reserved state exists. Therefore, when checked in the aforementioned step 219 that the value of b47-b45 of VTS_SPST_ATR is "111", the system controller 102 proceeds to step 225, thereby controlling the system parser 108 and the audio decoder 110 to enable the audio decoding of the sub-picture stream and to disable the sub-picture decoding. However, when checked in the above step 219 that the value of b47-455 of VTS_SPST_ATR is "000", the system controller 102 proceeds to step 223, thereby controlling the system parser 108 and the audio decoder 110 to disable the audio decoding of the bit stream and to enable the sub-picture decoding. In this case, the sub-picture data can be the audio title information of the title reproduced. Also, when checked therein that b47-45 of VTS_SPST_ATR has another value except for "111" and "000", the system controller 102 proceeds to step 221, thereby controlling the system parser 108 and the audio decoder 110 to disable the audio decoding of the sub-picture stream and sub-picture decoding.

The system controller 102 checks the coding mode of the sub-picture stream and the coding mode of the video stream for the VTSI information reproduced in the disc, analyzes whether or not the data of the corresponding stream, is the extended audio data, and controls the extended audio decoder 158 of the audio decoder 110 to be driven in case of the stream of the extended audio mode.

Figure 17A:
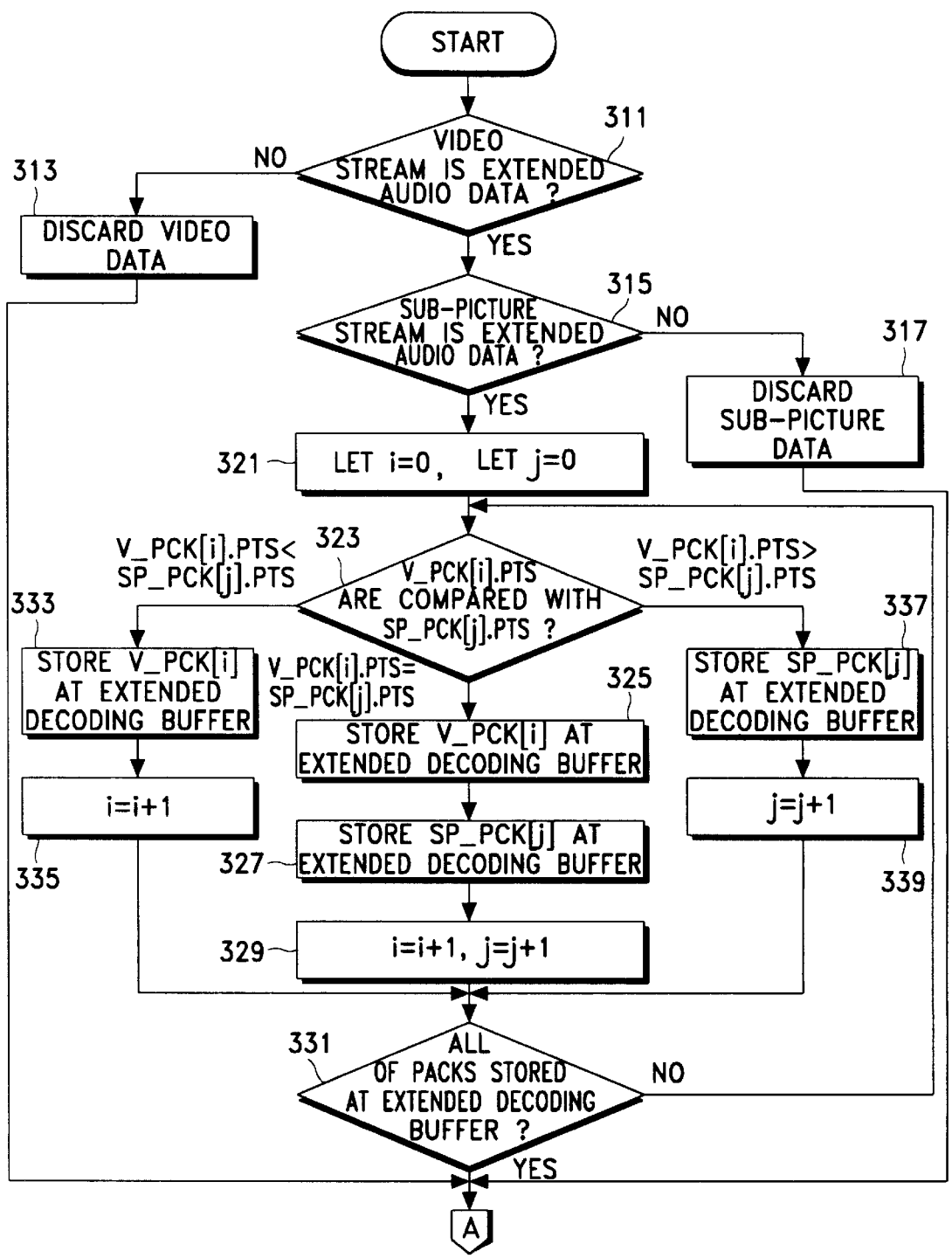
FIGS. 17A, 17B, and 17C are flow charts illustrating the processes of the extended audio decoder and the bandpass extender in the DVD-audio reproducing device, according to the embodiment of the present invention.
Figure 17B:
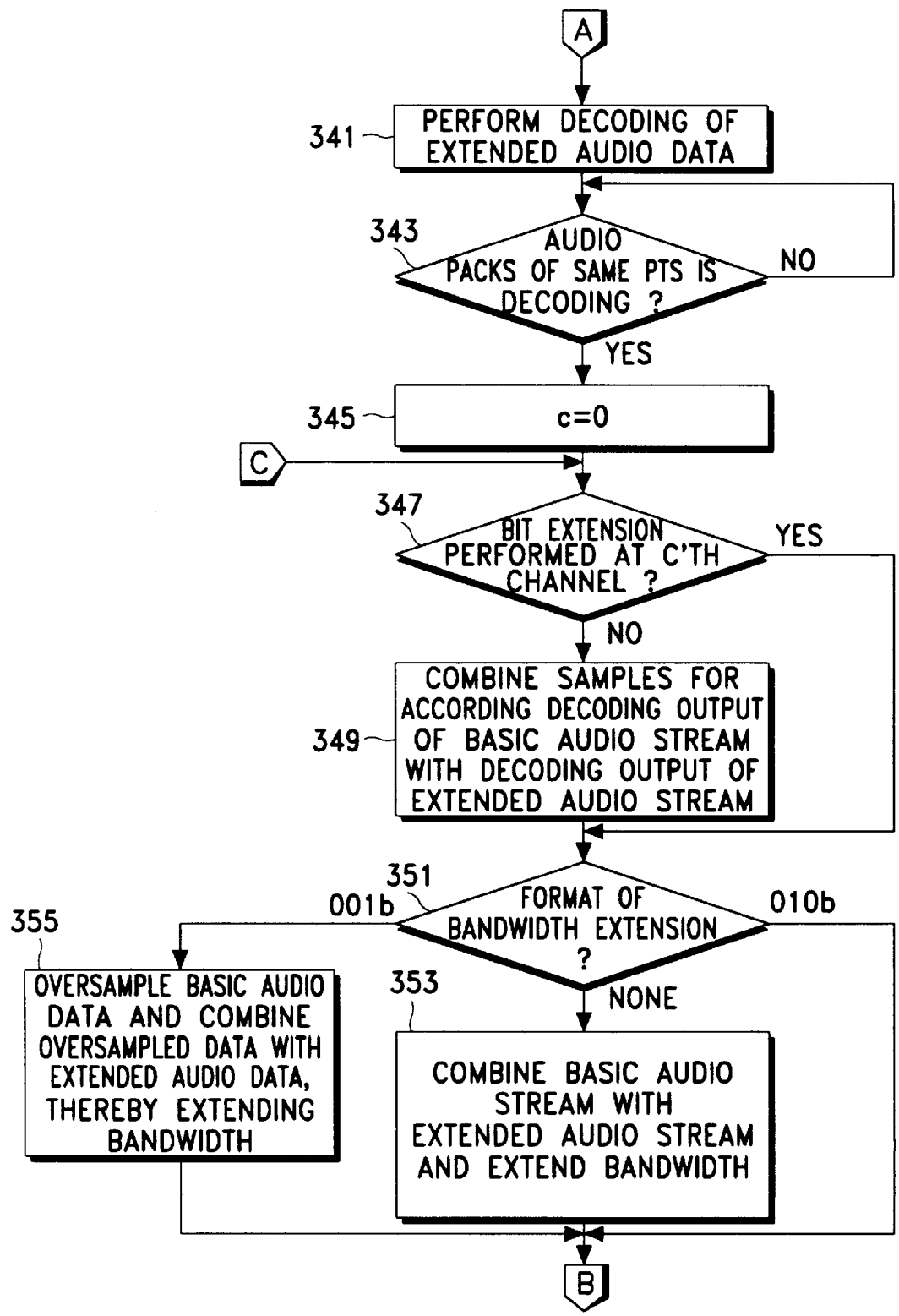

As stated hereinafter, in the reproducing mode of the DVD-audio that the extended audio data is recorded, the system controller 102 drives the audio decoder 110. Thus, the audio decoder 110 performs steps of FIGS. 17A and 17B then to decode and extend the audio data. FIGS. 17A and 17B are flow charts illustrating the processes of the extended audio decoder and the bandpass extender in the DVD-audio reproducing device.

Figure 17C:
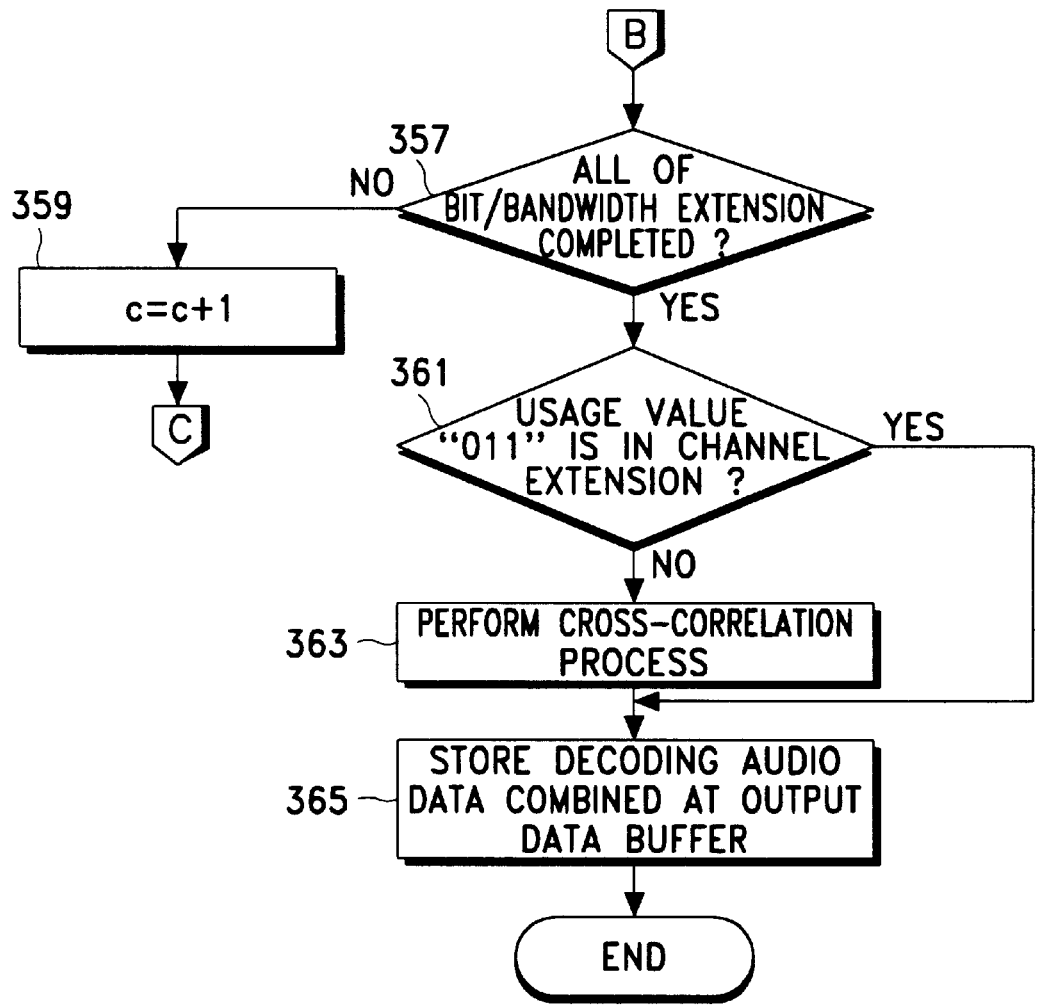

Referring to FIGS. 17A, 17B, and 17C, the decoding controller 152 checks in step 311 or 315 whether or not the video stream and the sub-picture stream are the extended audio data in accordance with the control data output from the system controller 102. At this time, when checked in the above step 311 that the video stream was not the extended audio data, the decoding controller 152 discards the video stream in step 313. Further, when checked in the above step 315 that the sub-picture stream was not the extended audio data, the decoding controller 152 discards the sub-picture stream data in step 317.

However, when checked in the above steps 311 and 315 that the video stream and the sub-picture stream were the extended audio stream, the decoding controller 152 initializes the video stream variable i and the sub-picture stream variable j as 0 in step 321. Hereinafter, the decoding controller 512 compares the current video pack V_PCK[i].PTS with the current sub-picture pack SP_PCK[j].PTS in step 323. At this moment, when checked in the foregoing step 323 that V_PCK[i].PTS=SP_PCK[j].PTS, the decoding controller 152 stores the current V_PCK[i] at the extended decoding buffer in step 325, stores the current SP_PCK[j] at the extended decoding buffer in step 327, and changes variables in conformity with i=i+1 and j=j+1 in step 329. However, when checked in the aforesaid step 323 that V_PCK[i].PTS<SP_PCK[j].PTS, the decoding controller 152 stores the current V_PCK[i] at the extended decoding buffer in step 333 and changes the variable in conformity with i=i+1 in step 335. Otherwise, when checked in the step 323 that V_PCK[i].PTS>SP_PCK[j].PTS, the decoding controller 152 stores the current SP_PCK[j] at the extended decoding buffer in step 337 and changes the variable in conformity with j=j+1 in step 339. After the foregoing steps 329, 335, and 339, the decoding controller 152 checks in step 331 whether or not all of the packs are stored at the extended decoding buffer. Thus, when checked that all of the packs are not stored thereat, the decoding controller 152 returns to the above step 323, thereby repeatedly performing the above steps. However, when checked that all of the packs are stored thereat, the decoding controller 152 proceeds to step 341 of FIG. 17B.

The decoding controller 152 performs the decoding of the extended audio data in step 341 and checks in step 343 whether or not the audio packs of the same PTS are decoded. Thus, when checked that the audio packs of the same PTS are not decoded, the decoding controller 152 returns to the above step 343, thereby standbying the audio pack decoding completion. However, when checked that the audio packs of the same PTS are decoded, the decoding controller 152 initializes the channel header variable c of the extended audio stream header having the construction equal to that of FIG. 9 as 0.

Thereafter, in step 347, the decoding controller 152 checks the usage value of the headers corresponding to the current c'th channel and checks whether or not the bit extension exists in the c'th channel. At this moment, when checked that bit extension existed therein, the decoding controller 152 proceeds to step 349, thereby combining the samples for conforming the decoding output of the basic audio stream and the decoding output of the extended audio stream, so as to perform the bit extension by controlling the extender 160. In this case, the bit extension method performed in the extender 160 is to combine the basic audio data with the extended audio data so as to increase the bits, as illustrated in FIG. 11.

When checked that the bit extension did not exist therein or after performing the step 349, the decoding controller 152 checks the usage value of the corresponding channel header c and, thus the bandwidth extension method in step 351. At this point, when the usage value thereof is "010", the decoding controller 152 controls the extender 160 in step 353, so that the basic audio data and the extended audio data of the 2-bands expression system can be combined with each other to thereby perform the bandwidth extension, as depicted in FIG. 12B. Also, when the usage value thereof is "001", the decoding controller 152 controls the extender 160 in step 355, thereby oversampling the basic audio data, thereby combining the oversampled basic audio data with the high-pass of the extended audio data and performing the bandwidth, as illustrated in FIG. 12A.

When checked in the above step 351 that the bandwidth extension did not exist or after performing the above step 353 or 355, the decoding controller 152 checks in step 357 of FIG. 17C whether or not the bit extension or the bandwidth extension of all of the extended audio data is completed. Thus, when checked that the bit extension or the bandwidth extension of all of the extended audio data is not completed, the decoding controller 152 proceeds to the step 359, thereby changing the variable for designating the next channel header as c=c+1 and then returning to the above step 347 so as to repeat the above steps.

However, when checked in the above step 357 that the bit extension or the bandwidth extension of all of the extended audio data is completed, the decoding controller 152 proceeds to the step 361, thereby checking whether or not the cross-correlation process is necessary for channel extension, by examining the usage area if any of the usage area contains "011." Here, when checked that the cross-correlation process was necessary for channel extension, the decoding controller 152 proceeds to step 363, thereby performing cross-correlation processing of the channel of the basic audio data and the channel of the extended audio data and removing the signal in the channel of the extended audio data combined with the channel of the basic audio data. To the contrary, when checked in the above step 361 that the cross-correlation process is not necessary for channel extension, the decoding controller 152 adds the channel of the extended audio data to the channel of the basic audio data and outputs the added channel. After processing the channel extension as described above, the decoding controller 152 controls the output data buffer 162, stores the extended decoding audio data combined at the output data buffer 162, and informs the system controller 102 of the result in step 365.

Concerning the operation of the DVD audio private reproducing device according to an embodiment of the present invention which performs the control operations as shown in FIGS. 16 and 17A through 17C and has the construction of FIGS. 14 and 15, the system controller 102 controls mechanisms, optical systems, and overall circuits of the reproducing device, controls the operation of the above device according to an operation of a user and performs the function of indicating the operation state. The mechanism & pick-up unit 104 reads the data recorded at the disc under the control of the system controller 102 and the driving mechanism of the mechanism & pick-up unit 104 performs all kinds of servo functions, for example, the spindle servo, the tracking servo, the focusing servo, etc., by the control of the servo controller. Thus, the data receiver 106 converts an RF signal output from the mechanism & pick-up unit 104 into the digital data and performs the error correction function of the converted digital data. The system parser 108 separates the video data, the audio data, the sub-picture data and the control data from the error-corrected digital audio data by the function thereof and transmits the separated data to the audio decoder 110, by the control of the system controller 102.

Then, the audio decoder 110 decodes and outputs the audio data and the video data transmitted from the system parser 108. At this case, the audio data is comprised of the basic audio data recorded at the audio stream and the extended audio data recorded at the video stream and the sub-picture stream. With respect to the operation of the audio decoder 110, the audio/video/sub-picture stream data output from the stream parser 108 is stored at the input data buffer 154. Thus, the decoding controller 152 initializes the basic audio decoder 156 and the extended audio decoder 158 by the control of the system controller 102.

The basic audio decoder 156 decodes the coding audio stream with PCM or other methods and outputs the PCM. Also, the extended audio decoder 158 converts and outputs the audio data existed in the video/sub-picture stream into the PCM data. The extended audio data can be PCM data, lossless coding data, bit stream data and pseudo-lossless psychoacoustic coding data. In this instance, the extended audio decoder 158 converts the extended audio data input by operating the decoder corresponding to the coding system into the PCM data. Then, in the case of reproducing the DVD-video, since the video data and the sub-picture data are input to the video/sub-picture stream, the extended audio decoder 158 is not operated.

The audio data output from the basic audio decoder 156 and the extended audio decoder 158 is applied to the extender 160, and the extender 160 performs the function such as the bit extension, the bandwidth extension, and the channel extension by combining the two PCM audio data. Herein, the extender 160 is also not operated upon reproducing the DVD-video. After being stored at the output data buffer 162, the finally-generated audio data is converted into the digital audio data format (IIS or EIAJ), to be thereby output to the audio outputter 112.

The audio decoder 110 as mentioned previously, decodes the basic audio data, analyzes the information recorded in the video and sub-picture streams, and checks whether the analyzed information is the video and sub-picture data or the extended audio data. After checking, when the analyzed information is the video data, the audio decoder 110 disables the decoding operation of the extended area. On the other hand, when the analyzed information is the extended audio data, the audio decoder 110 enables the decoding operation of the extended area. After completion of the decoding operation, the audio decoder 110 combines the audio data of the extended area with the audio data of the basic area, generates the audio data of the high-pass having the high resolution and wideband and processes the added channel as the audio channel of the basic area to be reproduced. When the audio data is generated at the full channel and full bandpass, the audio decoder 110 converts the sampling frequency and the quantization bit number to meet the generated audio data in conformity with the input format of the audio outputter 112. If the sampling frequency of the decoded audio data is more than that input from the audio outputter 112, the audio decoder 110 performs a decimation operation. Otherwise, the audio decoder 110 performs the oversampling. When the quantization bit number of the decoded audio data is more than that of the audio outputter 112, the audio decoder 110 performs bit truncation/rounding or requantization, and noise shaping. Otherwise, the methods of adding a decoder or adding 0 bit at the lower bit are used.

Figure 18:
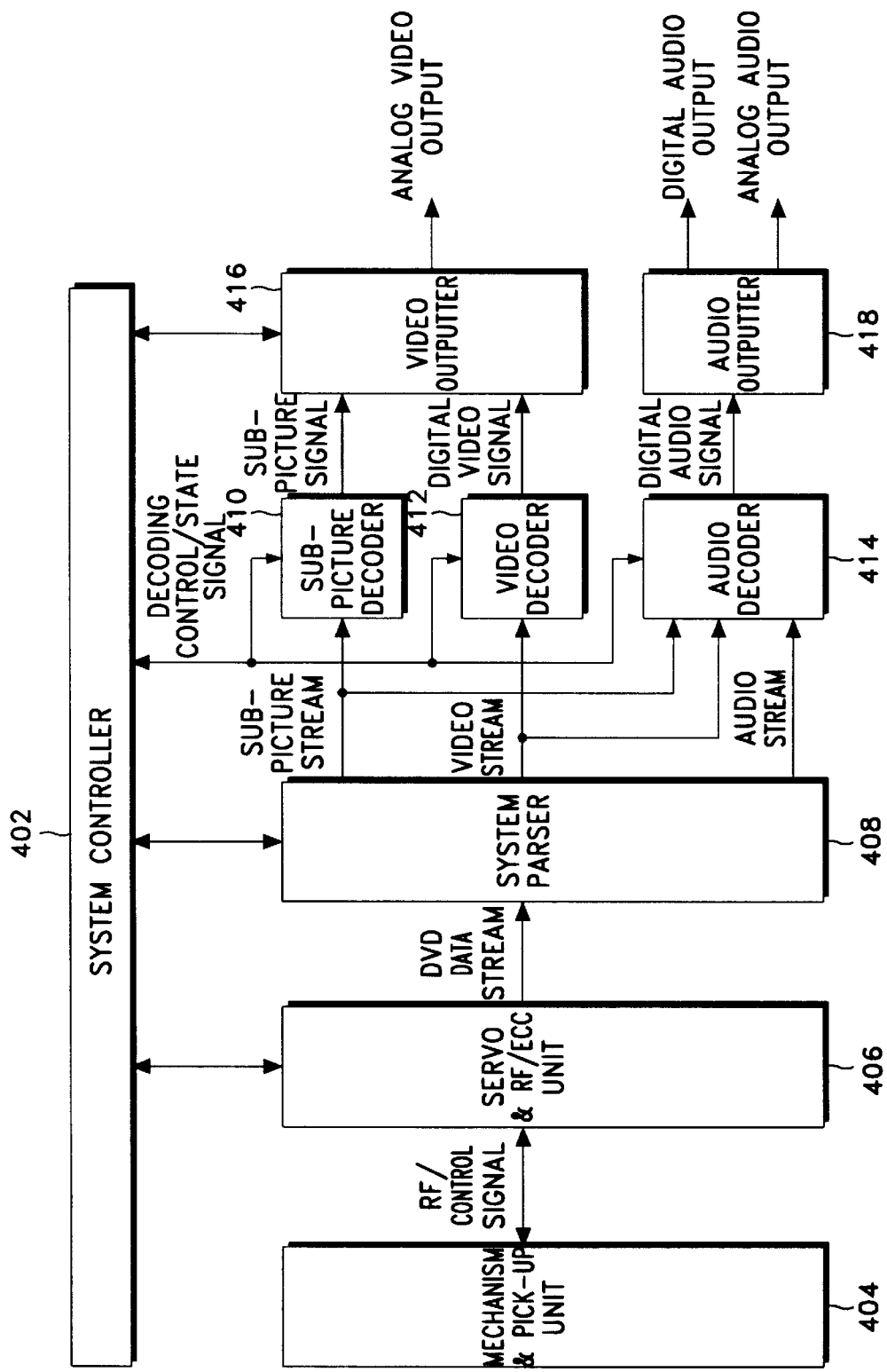
FIG. 18 shows the structure of a device for commonly reproducing both the DVD-video disc and the DVD-audio disc according to the embodiment of the present invention.

FIG. 18 shows the structure of a device for commonly reproducing both the DVD-video disc and the DVD-audio disc according to the embodiment of the present invention. A system controller 402 controls overall operations of the DVD-audio disc reproducing device and performs the user interface function. The system controller 402 analyzes the video title set information VTSI and checks whether the analyzed information is the DVD video or the DVD audio. At this time, after analyzing the coding mode of VTS_V_ATR and VTS_SPST_ATR in the information of the VTSI, upon recording the extended audio data at one stream of the video stream and the sub-picture stream, the system controller 402 judges that the analyzed information is the DVD-audio, thereby enabling the extended audio decoder of the corresponding stream and controlling the reproducing operation of the DVD-audio. However, when the bit stream and/or the sub-picture stream are in the state where the extended audio data is not recorded, the system controller 402 judges that the analyzed information is the DVD-video, thereby disabling the sub-picture decoder and the video decoder and terminating the reproducing operation of the DVD-audio.

A mechanism & pick-up unit 404 reads the data recorded at the DVD-audio disc and the DVD-audio disc. A servo & RF/ECC unit 406 analyzes and corrects the error of the audio data output from the mechanism & pick-up unit 404. The servo & RF/ECC unit 406 includes an error correction circuit (hereinafter, referred to as ECC). A servo controller for performing all kinds of servo functions by controlling the mechanism & pick-up unit 404 under the control of the system controller 402 is omitted in FIG. 18.

A system parser 408 separates the sub-picture stream, the video stream and the audio stream from the DVD data streams output from the servo & RF/ECC unit 406 under the control of the system controller 402 and outputs the separated stream.

A sub-picture decoder 410 receives the sub-picture stream output from the system parser 408. The sub-picture decoder 410 is not driven when the data of the sub-picture stream is the extended audio data under the control of the system controller 402 and is driven when the data of the sub-picture stream is the sub-picture data, thereby decoding-outputting the sub-picture data. A video decoder 412 receives the video stream output from the system parser 408. The video decoder 412 is not driven when the data of the video stream is the extended audio data under the control of the system controller 402 and is driven when the data of the video stream is the video data, thereby decoding-outputting the video data.

An audio decoder 414 includes a basic audio decoder and an extended audio decoder. The audio decoder 414 receives the sub-picture stream, the video stream, and the audio stream output from the system parser 408, decodes the basic audio data and the extended audio data by enabling corresponding decoders under the control of the system controller 402, combines the decoded audio data and the extended audio data, and outputs the digital audio data.

A video outputter 416 inputs the sub-picture data output from the sub-picture decoder 410 and the video data output from the video decoder 412 and converts the input data in conformity with the format of a display unit (not shown) to be output. An audio outputter 418 converts the input data into the digital audio data and the analog audio signal according to the characteristic of the device for reproducing the data with input of the decoded audio data output from the audio decoder 414 and outputs the converted data.

The device of FIG. 18 can be commonly used with both the DVD-audio and the DVD-video. As a consequence, the disc reproducing device having the construction of FIG. 18 can be commonly used as the DVD-audio of using the video/sub-picture stream as the extended audio stream, the DVD-audio of using the video stream as the extended audio stream and using intactly the sub-picture stream, the DVD_audio of intactly using the video stream and using the sub-picture stream as the extended audio streams, and the DVD-video of using the video and sub-picture streams as original video and sub-pictures.

Figure 19:
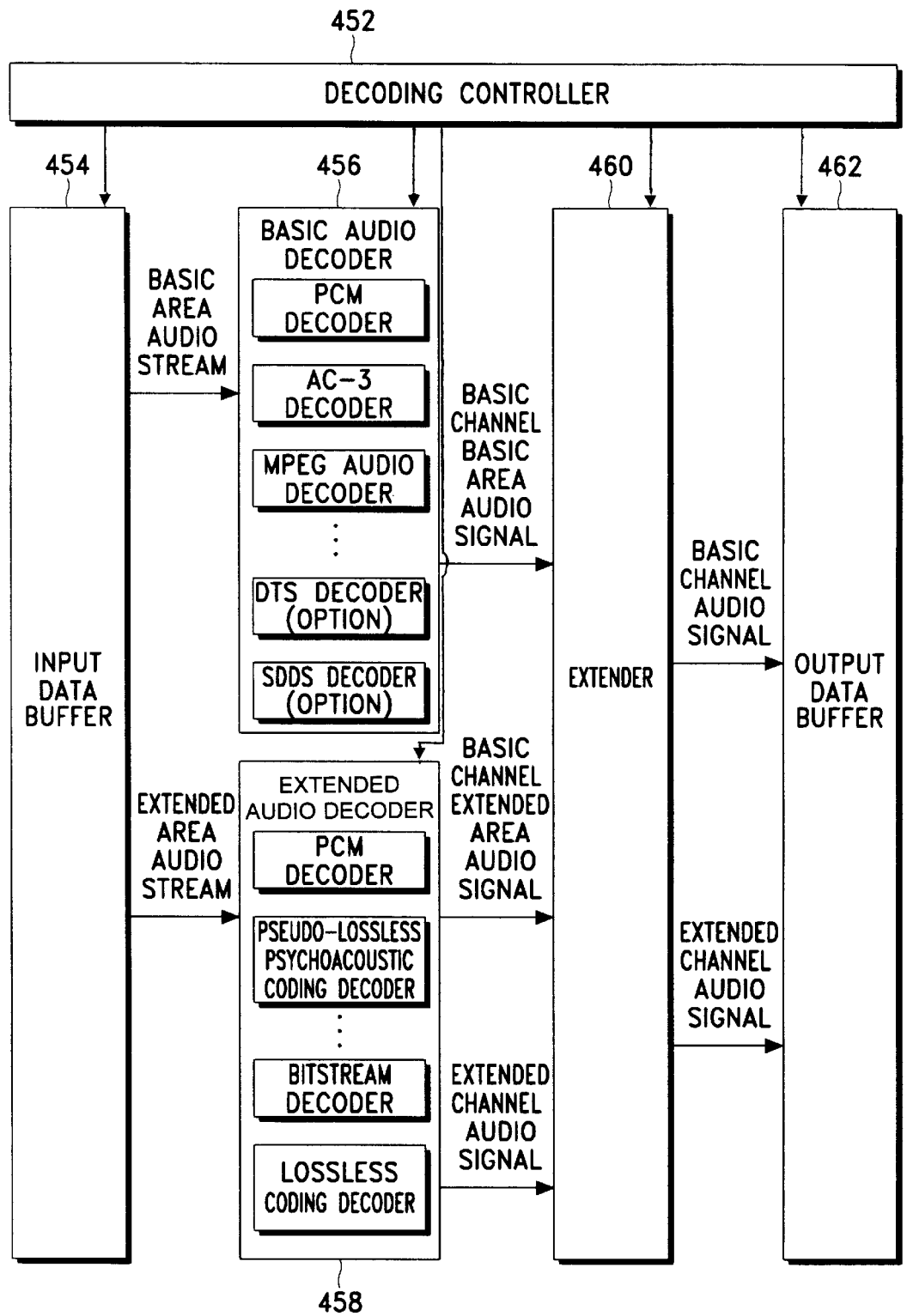
FIG. 19 shows the structure of the combined video/audio decoder in the reproducing device having the same structure as that of FIG. 18.

The audio decoder 414 further includes the basic audio decoder and the extended audio decoder so as to decode the basic audio data and the extended audio data according to an embodiment of the present invention, as illustrated in FIG. 19. FIG. 19 shows the structure of the combined video/audio decoder in the reproducing device having the same structure as that of FIG. 18.

With reference to FIG. 19, an input data buffer 454 inputs the sub-picture stream data, the video stream data, and the audio stream data output from the system parser 408, outputs the sub-picture stream data and the video stream data as the extended audio stream, and stores the audio stream data as the basic audio stream.

A basic audio decoder 456 includes the decoders corresponding to the coding modes of the audio data recorded in the audio stream of the DVD-audio. The basic audio decoder 456 includes an AC-3 decoder, MPEG-1 decoder, MPEG-2 decoder, LPCM decoder, DTS decoder(option), and SDDS decoder(option) depending on the audio decoding modes of the DVD-video. The basic audio decoder 456 inputs the audio stream of the basic audio area output from the input data buffer 454, and decoding-outputs the basic audio data input by driving the decoder corresponding to the audio coding mode of the basic audio stream by the control of the decoding controller 452.

An extended audio decoder 458 includes the decoders corresponding to the coding modes of the audio data recorded at the extended audio stream of the DVD-audio. The extended audio decoder 458 can further have a pseudo-lossless psychoacoustic coding decoder, a bit stream decoder and a lossless coding decoder regardless of the LPCM decoder. The extended audio decoder 458 inputs the audio stream of the extended audio area output from the input data buffer 454 and decoding-outputs the extended audio data input by driving the decoder corresponding to the audio coding mode of the extended audio stream under the control of the decoding controller 452.

The extender 460 analyzes the usage value positioned in the corresponding channel header of the extended audio data output from the extended audio decoder 458 and the basic audio data output from the basic audio decoder 456 and performs the function such as the bit extension, the bandwidth extension, and the channel extension. According to the embodiment of the present invention, the bit extension method is performed by combining the data of the basic audio area and the data of the extended audio area as shown in FIG. 11 and extending the number of the bits. The bandwidth extension method is performed by frequency-converting the data of the basic audio area, combining the frequency-converted data with the high-pass audio data of the extended audio area and extending the bandwidth as shown in FIG. 12A, or with combining the data of the basic audio area having the 2 bands expression system with the audio data of the extended audio area and extending the bandwidth as shown in FIG. 12B. The channel extension method is performed to cross-correlation process the channel of the basic audio data and the channel of the extended audio data, thereby removing the signal of the channel of the extended audio data combined with the basic audio data as shown in FIG. 13A, or intactly reproducing the channel of the basic audio data as the channel of the extended audio data as shown in FIG. 13B. In this case, the extender 460 becomes a bit/bandwidth/channel extender, which inputs the basic audio data of the basic channel output from the basic audio decoder 456 and the extended audio data of the basic channel output from the extended audio decoder 458 and combines the two types of audio data, so that the output audio data can be output after the bit extension and/or the bandwidth extension.

An output data buffer 462 inputs and stores the audio data output from the extender 460.

The decoding controller 452 generates control signals for controlling operations for all of the components of the audio decoder 414 under the control of the system controller 402.

Figure 20:
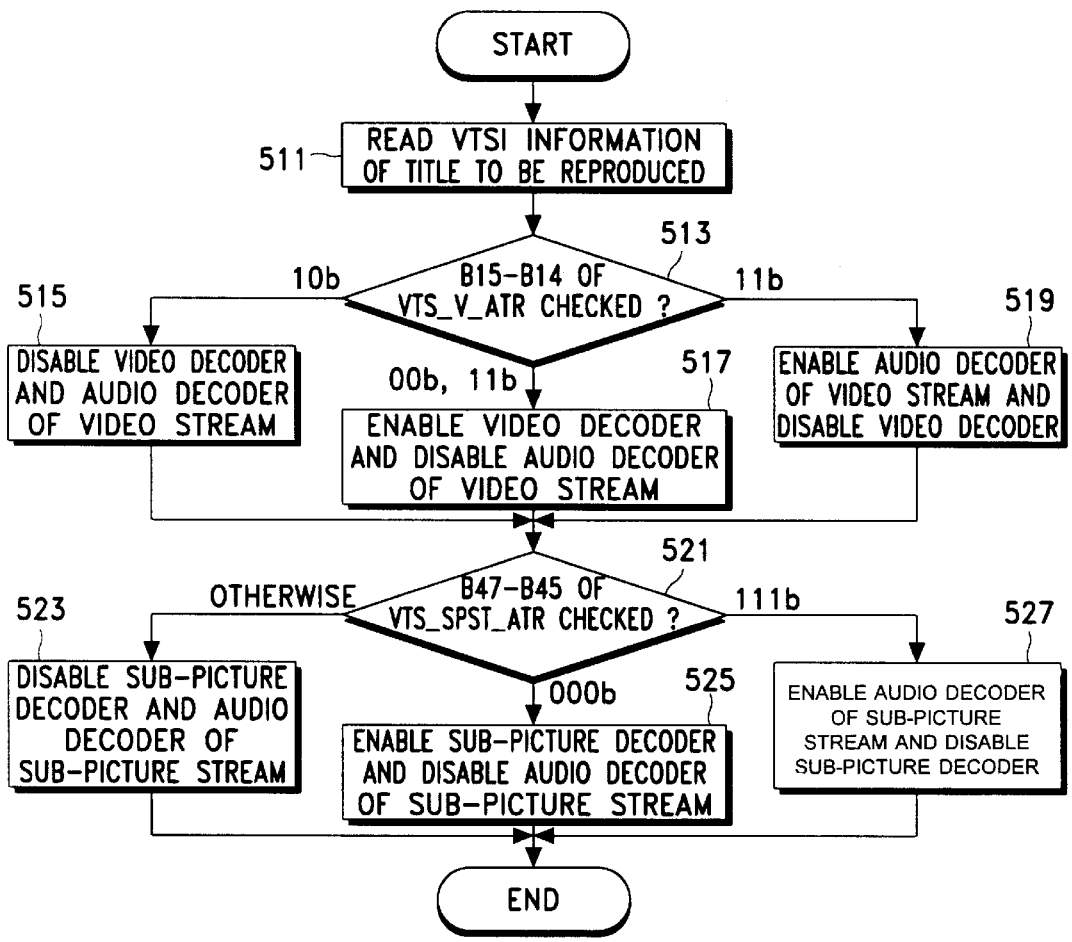
FIG. 20 is a flow chart illustrating the process of initializing the combined audio decoder for reproducing the title in the combined reproducing device as shown in FIG. 18.

FIG. 20 is a flow chart illustrating the process of initializing the combined audio decoder for reproducing the title in the combined reproducing device as shown in FIG. 18. In regard of FIG. 20, in the reproducing mode, the system controller 402 drives the mechanism & pickup unit 404 and reads the VTSI information of the title to be reproduced in the data read from the disc in step 511. After that, in step 513, the system controller 402 analyzes the attribute information of the video stream after reading b15-b14 of VTS_V_ATR of VTSI_MAT. At this point, the VTS_V_ATR has the construction equal of that of FIG. 6A, and the value of b15-b14 becomes the video compression mode information. In this event, when the value of b15-b14 is "11", it is checked that the extended audio mode exists. But, when the value thereof is "00" or "01", it is checked that the video mode exists. Also, when the value thereof is "10", it is checked that the video mode and the extended audio mode do not exist. Therefore, when checked in the above step 513 that the value of b15-b14 of VTS_V_ATR is "11", the system controller 402 proceeds to step 519, thereby controlling the system parser 408 and the audio decoder 414 to enable the audio decoding of the video stream and to disable the video decoder 412. However, when checked in the above step 513 that the value of b15-14 of VTS_V_ATR is "00" or "01", the system controller 402 proceeds to step 517, thereby enabling the video decoder 412 and disabling the audio decoding of the video stream. Also, when checked in the above step 513 that the value of b15-14 of VTS_V_ATR is "10", the system controller 402 proceeds to step 515, thereby controlling the system parser 408 and the audio decoder 414 to disable the audio decoding of the video stream and the video decoder 412.

After performing the foregoing step 515, 517, or 519, in step 521, the system controller 402 analyzes the attribute information of the sub-picture stream by reading b47-b45 of VTS_SPST_ATR of the VTSI_MAT. In this instance, VTS_SPST_ATR has the construction equal to that of FIG. 6B, and the value of b47-b45 becomes the sub-picture coding mode information. In this event, when the value of b47-b45 is "111", it is checked that the extended audio mode exists. But, when the value thereof is "000", it is checked that the sub-picture mode exists. Also, when b47-b45 has other values except for "000" and "111", it is checked that the reserved state exists. Therefore, when checked in the above step 521 that the value of b47-b45 of VTS_SPST_ATR is "000", the system controller 402 proceeds to step 525, thereby controlling the system parser 408 and the audio decoder 414 to enable the sub-picture decoder 410 and to disable the audio decoding of the sub-picture stream. In this case, the sub-picture data can be the audio title information of the title reproduced. Also, when checked in the above step 521 that the value of b47-b45 of VTS_SPST_ATR is "111", the system controller 402 proceeds to step 527, thereby enabling the audio decoding of the sub-picture stream and disabling the sub-picture decoder 410. Also, when checked in the above step 521 that b47-45 of VTS_SPST_ATR has another value except for "111" and "000", the system controller 402 proceeds to step 523, thereby controlling the system parser 408 and the audio decoder 414 to disable the audio decoding of the sub-picture stream and sub-picture decoder 410.

The system controller 402 checks the coding mode of the sub-picture stream and the coding mode of the video stream for the VTSI information reproduced in the disc, analyzes whether or not the data of the corresponding stream is the extended audio data, and controls the extended audio decoder 458 of the audio decoder 414 to be driven in case of the stream of the extended audio mode.

As stated hereinafter, in the reproducing mode of the DVD-audio that the extended audio data is recorded, the system controller 402 drives the audio decoder 414. Thus, the audio decoder 414 performs steps of FIGS. 17A through 17C to decode and extend the audio data.

The device for commonly reproducing the DVD-audio and the DVD-video according to the embodiment of the present invention includes the sub-picture 410, the video decoder 412, the basic audio decoder 456, the extended audio decoder 458, and the extender 460, which analyzes the VTSI information of the reproduced title, checks the existence/nonexistence of the extended audio data, and decoding-outputs the data of each corresponding stream according the checking results.

Consequently, the device for commonly reproducing the DVD-audio and the DVD-video can perform four functions as below.

In case that the video stream and the sub-picture stream are the extended audio stream, the system controller 402 controls the system parser 408, the decoders 410, 412, and 414, and performs the reproducing mode of the DVD-audio. In this case, the system parser 408 transmits the video stream to the video decoder 412 and transmits the sub-picture stream to the sub-picture decoder 410. As well, the system parser 408 transmits the data of the video stream and the sub-picture stream with the audio stream to the audio decoder 414. Here, as shown in FIG. 20, the sub-picture decoder 410 and the video decoder 412 are disabled and the extended audio decoder 458 of the audio decoder 414 is disabled. Thus, the video stream and the sub-picture stream having the extended audio data are applied to the extended audio decoder 458 of the audio decoder 414, the audio stream is applied to the basic audio decoder 456 of the audio decoder 414, and the extender 460 combines the decoded basic audio data and the extended audio data with each other, thereby extending the bits, the bandwidth, and the channel.

In case that the video stream is the extended audio stream and the sub-picture stream is not the extended audio stream, the system controller 402 controls the system parser 408, the decoders 410, 412, and 414, and performs the reproducing mode of the DVD-audio. At this case, the system parser 408 transmits the video stream to the video decoder 412 and transmits the sub-picture stream to the sub-picture decoder 410. As well, the system parser 408 transmits the video stream with the audio stream to the audio decoder 414. Here, as shown in FIG. 20, the sub-picture decoder 410 is enabled, the video decoder 412 is disabled and the extended audio decoder 458 of the audio decoder 414 is disabled. Thus, when the video stream having the extended audio data is applied to the extended audio decoder 458 of the audio decoder 414, the audio stream is applied to the basic audio decoder 456 of the audio decoder 414 and the sub-picture stream is applied to the sub-picture decoder 410. In this case, the sub-picture decoder 410 decodes the data of the sub-picture stream and outputs the language information of the reproduced audio, and the extender 460 combines the decoded basic audio data and the extended audio data with each other, thereby extending the bits, the bandwidth, and the channel.

In case that the video stream is an original video stream and the sub-picture stream is the extended audio stream, the system controller 402 controls the system parser 408, the decoders 410, 412, and 414, and performs the reproducing mode of the DVD-audio. At this case, the system parser 408 transmits the video stream to the video decoder 412 and transmits the sub-picture stream to the sub-picture decoder 410. As well, the system parser 408 transmits the sub-picture stream with the audio stream to the audio decoder 414. Here, as shown in FIG. 20, the sub-picture decoder 410 is disabled, the video decoder 412 is enabled and the extended audio decoder 458 of the audio decoder 414 is enabled. Thus, when the sub-picture stream having the extended audio data is applied to the extended audio decoder 458 of the audio decoder 414, the audio stream is applied to the basic audio decoder 456 of the audio decoder 414 and the video stream is applied to the video decoder 412. In this case, the video decoder 412 decodes the data of the video stream and outputs the picture information of the reproduced audio, and the extender 460 combines the decoded basic audio data and the extended audio data with each other, thereby extending the bits, the bandwidth, and the channel.

In case that the video stream and the sub-picture stream are not the extended audio stream, the system controller 402 controls the system parser 408, the decoders 410, 412, and 414, and performs the reproducing mode of the DVD-audio. In this case, the system parser 408 transmits the video stream to the video decoder 412, transmits the sub-picture stream to the sub-picture decoder 410, and transmits the audio stream to the audio decoder 414. Also, as shown in FIG. 20, the sub-picture decoder 410 and the video decoder 412 are enabled and the extended audio decoder 458 of the audio decoder 414 is disabled. Thus, the video stream is applied to the video decoder 412 to be decoded as the picture data and the sub-picture stream is applied to the sub-picture decoder 410 to be reproduced as the language information of the reproduced video and audio. In this case, now that the extended audio decoder 458 thereof is not operated, the basic audio decoder 456 reproduces the audio data recorded in the basic audio area.

As apparent from the foregoing, the DVD-audio according to the embodiment of the present invention selectively uses the video stream and the sub-picture stream of the DVD video and records the extended audio data, thereby improving the sound quality of the audio data. That is, because of performing the bit extension, the bandwidth extension, and the channel extension by combining the basic audio data with the extended audio data of the DVD-video, the DVD-audio can enhance the quality of the reproduced audio. Likewise, since the DVD-audio records the extended audio data in correspondence with the standard of the DVD-video, the DVD-audio can be replaced with the DVD-video reproducing device. In the device for commonly reproducing the DVD-audio and the DVD-video capable of being used in the video disc and the chip set of the DVD-video reproducing device, it is advantageous in that the high sound quality of the audio can be reproduced by installing a new decoder while being reciprocally used with the DVD-video reproducing device.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A device for reproducing a DVD audio disc which has a video title set having a video attribute including an extended audio data mode indicator, a sub-picture attribute including said extended audio data mode indicator, basic audio packs for storing basic audio data, video/sub-picture packs including an extended audio stream, said extended audio stream comprising an extended audio stream header and frames, said extended audio stream header comprising a usage area for storing an audio coding mode indicator, a sampling frequency, a quantization bit number, and usage data of extended audio data, and said usage area of said extended audio data indicating bit extension, bandwidth extension, and channel extension of said extended audio data, wherein said video/sub-picture packs are formed as extended audio packs for selectively recording the extended audio data on the DVD audio disc, and said extended audio packs are combinable with said basic audio packs to be reproduced as audio data, said device comprising:

a basic audio decoder;

an extended audio decoder; and an extender;

wherein said basic audio decoder reproduces said basic audio data of said basic audio pack, said extended audio decoder reproduces said extended audio data and said extender combines said extended audio data with said basic audio data, performing bit extension, bandwidth extension, and channel extension of said combined basic audio data and extended audio data, to generate output audio data.

2. The device as defined in claim 1, wherein said extender comprises:

a bit extender to arrange said basic audio data at an upper bit and said extended audio data at a lower bit, to extend a bit number of said output audio data;

a bandwidth extender to oversample said basic audio data, making the oversampled data equal to said sampling frequency of said extended audio data and adding said oversampled basic audio data to said extended audio data, to extend a bandwidth of said output audio data; and a channel extender for intactly outputting channels of said basic audio data and channels of said extended audio data, to extend a number of the channels of said output audio data.

3. The device as defined in claim 1, wherein said extender is comprised of:
- a bit extender to arrange said basic audio data at an upper bit and said extended audio data at a lower bit, to extend a bit number of said output audio data;
- a bandwidth extender having a perfect reconstruction FIR filter to combine 2-bands audio data with said extended audio data of a same sampling frequency of frequency-converted high-pass with said basic audio data having a smaller sampling frequency, to extend a bandwidth of said output audio data; and
- a channel extender for intactly outputting channels of said basic audio data and channels of said extended audio data, to extend a number of the channels of said output audio data.

4. The device as defined in claim 1, wherein said extender comprises:
- a bit extender to arrange said basic audio data at an upper bit and said extended audio data at a lower bit, to extend a bit number of said output audio data;
- a bandwidth extender to oversample said basic audio data, making the oversampled data equal to said sampling frequency of said extended audio data and adding said oversampled basic audio data to said extended audio data, to extend a bandwidth of said output audio data; and
- a channel extender having a cross-correlation processor to combine channels of said basic audio data and channels of said extended audio data and removing a signal of said extended audio channels included in said basic audio data, thereby extending a channel number of said output audio data.

5. The device as defined in claim 1, wherein said extender comprises:
- a bit extender to arrange said basic audio data at an upper bit and said extended audio data at a lower bit, to extend a bit number of said output audio data;
- a bandwidth extender having a perfect reconstruction FIR filter to combine 2-bands audio data with said extended audio data of a same sampling frequency of frequency-converted high-pass with said basic audio data having a smaller sampling frequency, to extend a bandwidth of said output audio data; and
- a channel extender having a cross-correlation processor to combine channels of the basic audio data and channels of said extended audio data and removing a signal of said extended audio channels included in said basic audio data, thereby extending a channel number of said output audio data.

6. A device for commonly reproducing a DVD audio disc and a DVD video disc, wherein the DVD audio disc has a video title set having a video attribute including an extended audio data mode indicator, a sub-picture attribute including said extended audio data mode indicator, basic audio packs for storing basic audio data, video/sub-picture packs including an extended audio stream, said extended audio stream comprising an extended audio stream header and frames, said extended audio stream header comprising a usage area for storing an audio coding mode indicator, a sampling frequency, quantization bit number, and usage data of extended audio data, and said usage area of said extended audio data indicating bit extension, bandwidth extension, and channel extension of said extended audio data, wherein said video/sub-picture packs are formed as extended audio packs for selectively recording the extended audio data on the DVD audio disc, wherein said extended audio packs are combinable with said basic audio packs to be reproduced as audio data, and the DVD video disc has the basic audio packs, video packs, and sub-picture packs, said device comprising:
- a controller;
- a video decoder;
- a sub-picture decoder;
- a basic audio decoder;
- an extended audio decoder; and
- an extender;
- wherein when said device is in a DVD audio disc reproducing mode, said controller disables said video decoder and said sub-picture decoder, said basic audio decoder reproduces data of said basic audio pack, said extended audio decoder reproduces said extended audio data, and said extender combines said extended audio data with said basic audio data, to perform bit extension, bandwidth extension, and channel extension of said combined audio data and extended audio data, to generate output audio data; and
- wherein when said device is in a DVD video disc reproducing mode, said controller disables said extended audio decoder and said extender, said basic audio decoder reproduces data of said basic audio pack, said video decoder reproduces said video pack, and said sub-picture decoder reproduces said sub-picture pack.

7. The device as defined in claim 6, wherein said extender comprises:
- a bit extender to arrange said basic audio data at an upper bit and said extended audio data at a lower bit, to extend a bit number of said output audio data;
- a bandwidth extender to oversample said basic audio data, making the oversampled data equal to said sampling frequency of said extended audio data and adding said oversampled basic audio data to said extended audio data, to extend a bandwidth of said output audio data; and
- a channel extender for intactly outputting channels of said basic audio data and channels of said extended audio data, to extend a number of the channels of said output audio data.

8. The device as defined in claim 6, wherein said extender comprises:
- a bit extender to arrange said basic audio data at an upper bit and said extended audio data at a lower bit, to extend a bit number of said output audio data;
- a bandwidth extender having a perfect reconstruction FIR filter to combine 2-bands audio data with said extended audio data of a same sampling frequency of frequency-converted high-pass with said basic audio data having a smaller sampling frequency, to extend a bandwidth of said output audio data; and
- a channel extender for intactly outputting channels of said basic audio data and channels of said extended audio data, to extend a number of the channels of said output audio data.

9. The device as defined in claim 6, wherein said extender comprises:
- a bit extender to arrange said basic audio data at an upper bit and said extended audio data at a lower bit, to extend a bit number of said output audio data;
- a bandwidth extender to oversample said basic audio data, making the oversampled data equal to said sampling frequency of said extended audio data and adding said oversampled basic audio data to said extended audio data, to extend a bandwidth of said output audio data; and a channel extender having a cross-correlation processor to combine channels of said basic audio data and channels of said extended audio data and removing a signal of said extended audio channels included in said basic audio data, thereby extending a channel number of said output audio data.

10. The device as defined in claim 6, wherein said extender comprises:

a bit extender to arrange said basic audio data at an upper bit and said extended audio data at a lower bit, to extend a bit number of said output audio data;

a bandwidth extender having a perfect reconstruction FIR filter to combine 2-bands audio data with said extended audio data of a same sampling frequency of frequency-converted high-pass with said basic audio data having a smaller sampling frequency, to extend a bandwidth of said output audio data; and a channel extender having a cross-correlation processor to combine channels of the basic audio data and channels of said extended audio data and removing a signal of said extended audio channels included in said basic audio data, thereby extending a channel number of said output audio data.

11. A method for reproducing data from a DVD audio disc which records basic audio data in an audio data recording area and extended audio data at video and sub-picture data recording areas in accordance with a DVD video standard for recording video data, sub-picture data, and audio data at each of a plurality of video title set areas, the method comprising the steps of:

(a) analyzing video and sub-picture attributes of the video title set to be reproduced;

(b) enabling a basic audio decoder to decode said basic audio data and an extended audio decoder to decode said extended audio data in an extended audio mode;

(c) checking usage of the extended audio data included in channel headers of the corresponding video title set; and (d) combining the extended audio data decoded by said extended audio decoder with said basic audio data decoded by said basic audio decoder, to generate output audio data.

12. The method as defined in claim 11, wherein said step (d) comprises the steps of:

arranging said basic audio data at an upper bit and said extended audio data at a lower bit, to extend a number of bits of said output audio data;

combining said basic audio data with said extended audio data, to extend a bandwidth of said output audio data; and combining a channel of said extended audio data with a channel of said basic audio data, to extend the number of bits.

13. A method for reproducing data from a DVD audio disc which records basic audio data in an audio data recording area, extended audio data in a video picture data recording area and sub-picture data in a sub-picture data recording area in accordance with a DVD video standard for recording video data, the sub-picture data, and the audio data in each of a plurality of video title set areas, the method comprising the steps of:

(a) analyzing a video attribute of the video title set to be reproduced;

(b) enabling a sub-picture decoder to decode said sub-picture data, a basic audio decoder to decode said basic audio data and an extended audio decoder to decode said extended audio data in an extended audio mode;

(c) checking usage of said extended audio data included in channel headers of the corresponding video title set;

(d) combining said extended audio data decoded by said extended audio decoder with said basic audio data decoded by said basic audio decoder; and (e) outputting said sub-picture data output from said sub-picture decoder as language information of reproduced audio.

14. The method as defined in claim 13, wherein said step (d) comprises the steps of:

arranging said basic audio data at an upper bit and said extended audio data at a lower bit, to extend a number of bits of said output audio data;

combining said basic audio data with said extended audio data, to extend a bandwidth of said output audio data; and combining a channel of said extended audio data with a channel of said basic audio data, to extend the number of bits.

15. A method for reproducing data from a DVD audio disc which records basic audio data in an audio data recording area, extended audio data in a sub-picture data recording area and video data in a video data recording area in accordance with a DVD video standard for recording the video data, sub-picture data, and the audio data in each of a plurality of video title set areas, comprising the steps of:

(a) analyzing sub-picture attributes of the video title set to be reproduced;

(b) enabling a video decoder to decode said video data, a basic audio decoder to decode said basic audio data and an extended audio decoder to decode said extended audio data in an extended audio mode;

(c) checking usage of said extended audio data included in channel headers of the corresponding video title set;

(d) combining said extended audio data decoded by said extended audio decoder with said basic audio data decoded by said basic audio decoder; and (e) outputting the video data output from said video decoder as picture information of reproduced audio.

16. The method as defined in claim 15, wherein said step (d) comprises the steps of:

arranging said basic audio data at an upper bit and said extended audio data at a lower bit, to extend a number of bits of said output audio data;

combining said basic audio data with said extended audio data, to extend a bandwidth of said output audio data; and combining a channel of said extended audio data with a channel of said basic audio data, to extend the number of bits.

17. A digital versatile disc (DVD), comprising:

an audio data recording area arranged in accordance with a DVD video standard;

a video data recording area arranged in accordance with said DVD video standard; and a sub-picture data recording area arranged in accordance with said DVD video standard;

wherein said audio data recording area stores basic audio data, and at least one of said video data recording area and said sub-picture recording area stores extended audio data, said extended audio data to be combined with said basic audio data upon reproduction to produce output audio data.

18. The DVD as claimed in claim 17, wherein if said video data recording area stores said extended audio data, then said sub-picture data recording area stores sub-picture data.

19. The DVD as claimed in claim 18, wherein said sub-picture data is language information of reproduced video data.

20. The DVD as claimed in claim 17, wherein if said sub-picture data recording area stores said extended audio data, then said video data recording area stores video data.

21. The DVD as claimed in claim 20, wherein said video data is picture information of reproduced audio data.

22. The DVD as claimed in claim 17, wherein the one of said video data recording area and said sub-picture data recording area which stores said extended audio data further stores an extended audio stream header and frames, said extended audio stream header comprising a usage area for storing an audio coding mode indicator, a sampling frequency, a quantization bit number, and usage data of said extended audio data, and said usage area of said extended audio data indicating bit extension, bandwidth extension, and channel extension of said extended audio data.

23. A reproducing device for reproducing data from a digital versatile disc (DVD) including an audio data recording area arranged in accordance with a DVD video standard, a video data recording area arranged in accordance with said DVD video standard, and a sub-picture data recording area arranged in accordance with said DVD video standard, wherein said audio data recording area stores basic audio data, and one of said video data recording area and said sub-picture recording area stores extended audio data, the reproducing device comprising:

a basic audio decoder to decode said basic audio data;

an extended audio decoder to decode said extended audio data; and an extender to combine said decoded extended audio data with said decoded basic audio data, and performing bit extension, bandwidth extension, and channel extension of said combined basic audio data and extended audio data, to generate output audio data.

24. A method for reproducing data from a DVD audio disc which records basic audio data in an audio data recording area, extended audio data in a video picture data recording area and a sub-picture data recording area in accordance with a DVD video standard for recording video data, sub-picture data, and the audio data in each of a plurality of video title set areas, the method comprising the steps of:

(a) analyzing attributes of the video title set to be reproduced;

(b) decoding said basic audio data and decoding said extended audio data in an extended audio mode by synchronizing said extended audio data stored in said video picture data recording area with said extended audio data stored in said sub-picture data recording area using PTS which indicates presentation time stamp;

(c) checking usage of said extended audio data included in channel headers of the corresponding video title set; and (d) combining said decoded extended audio data with said decoded basic audio data.

\* \* \* \* \*